(12) United States Patent
Hewage et al.

(10) Patent No.: US 11,610,132 B2
(45) Date of Patent: Mar. 21, 2023

(54) TIME INVARIANT CLASSIFICATION

(71) Applicant: BIOS HEALTH LTD, Cambridgeshire (GB)

(72) Inventors: Emil Hewage, Aberdeenshire (GB); Oliver Armitage, London (GB); Josias Van Der Westhuizen, Cambridgeshire (GB); Tristan Edwards, Oxfordshire (GB)

(73) Assignee: BIOS HEALTH LTD, Cambridgeshire (GB)

( * ) Notice: Subject to any disclaimer, the term of this patent is extended or adjusted under 35 U.S.C. 154(b) by 384 days.

(21) Appl. No.: 16/763,956

(22) PCT Filed: Nov. 13, 2018

(86) PCT No.: PCT/GB2018/053287
§ 371 (c)(1),
(2) Date: May 13, 2020

(87) PCT Pub. No.: WO2019/092459
PCT Pub. Date: May 16, 2019

(65) Prior Publication Data
US 2020/0387798 A1     Dec. 10, 2020

(30) Foreign Application Priority Data

Nov. 13, 2017 (GB) .................................... 1718756
Nov. 20, 2017 (GB) .................................... 1719257

(51) Int. Cl.
*G06N 3/08* (2006.01)
*G06N 3/088* (2023.01)
*G06N 3/04* (2023.01)

(52) U.S. Cl.
CPC ........... *G06N 3/088* (2013.01); *G06N 3/0454* (2013.01)

(58) Field of Classification Search
CPC ............................ G06N 3/088; G06N 3/0454
See application file for complete search history.

(56) References Cited

U.S. PATENT DOCUMENTS 10,658,005 B1 *   5/2020   Bogan, III ........... G11B 27/031
10,803,646 B1 *  10/2020   Bogan, III ........... G06V 40/174
(Continued)

FOREIGN PATENT DOCUMENTS

JP        2016-538980 A      12/2016
JP        2017-529209 A      10/2017
(Continued)

OTHER PUBLICATIONS

D. Campo, V. Bastani, L. Marcenaro and C. Regazzoni, "Incremental learning of environment interactive structures from trajectories of individuals," 2016 19th International Conference on Information Fusion (Fusion), 2016, pp. 589-596. (Year: 2016).*

(Continued)

*Primary Examiner* — Charles L Beard
(74) *Attorney, Agent, or Firm* — Arentfox Schiff LLP

(57) ABSTRACT

Method(s) and apparatus are provided for operating and training an autoencoder. The autoencoder outputs a latent vector of an N-dimensional latent space for classifying input data. The latent vector includes a label vector y and a style vector z. The style vector z is regularised during training for effecting time invariance in the set of label vectors y associated with the input data. Method(s) and apparatus are further provided for controlling the optimisation of an autoencoder. The autoencoder outputting a latent vector of an N-dimensional latent space for classifying input data. The latent vector comprising a label vector y and a style vector z. The regularisation of the style vector z is controlled to increase or decrease the time invariance of the label vectors y. An autoencoder configured based on the above-mentioned trained autoencoder that regularised the style vector z for (Continued)

effecting time invariance in the set of label vectors y associated with the input data during classification.

20 Claims, 14 Drawing Sheets

(56) References Cited

U.S. PATENT DOCUMENTS

| | | | |
|---|---|---|---|
| 10,930,066 B1* | 2/2021 | Thacker | G06F 40/40 |
| 11,443,192 B2* | 9/2022 | Mehr | G06N 20/00 |
| 11,449,537 B2* | 9/2022 | Chawla | G06F 16/35 |
| 11,475,332 B2* | 10/2022 | Gormally | G06N 20/00 |
| 2016/0028850 A1* | 1/2016 | Okamoto | G06K 9/00 709/222 |
| 2017/0161606 A1* | 6/2017 | Duan | G06N 3/08 |
| 2018/0300481 A1* | 10/2018 | Parinov | G06F 21/56 |
| 2019/0046068 A1* | 2/2019 | Ceccaldi | G06K 9/6271 |
| 2019/0049540 A1* | 2/2019 | Odry | G06N 3/084 |
| 2019/0095798 A1* | 3/2019 | Baker | G06N 3/082 |
| 2019/0130212 A1* | 5/2019 | Cheng | G06N 3/0445 |
| 2019/0130278 A1* | 5/2019 | Karras | G06N 3/0472 |
| 2019/0171908 A1* | 6/2019 | Salavon | G06V 10/82 |
| 2019/0259474 A1* | 8/2019 | Wang | G16C 20/50 |
| 2019/0295302 A1* | 9/2019 | Fu | G06N 3/088 |
| 2019/0377955 A1* | 12/2019 | Swaminathan | G06V 10/454 |
| 2020/0118648 A1* | 4/2020 | Chang | G06N 3/0454 |
| 2020/0134415 A1* | 4/2020 | Haidar | G06N 3/02 |
| 2020/0134428 A1* | 4/2020 | Cheng | G06N 3/0454 |
| 2020/0135052 A1* | 4/2020 | Singh | A63F 13/52 |
| 2020/0160176 A1* | 5/2020 | Mehrasa | G06N 3/0445 |
| 2020/0176121 A1* | 6/2020 | Dalal | G16H 20/60 |
| 2020/0195683 A1* | 6/2020 | Kuppa | H04L 63/1416 |
| 2020/0240346 A1* | 7/2020 | Schiegg | G01M 15/102 |
| 2020/0274787 A1* | 8/2020 | Dasgupta | H04L 47/36 |
| 2020/0293901 A1* | 9/2020 | Wachi | G06N 3/0454 |
| 2020/0372638 A1* | 11/2020 | Gregson | G16H 30/40 |
| 2020/0394461 A1* | 12/2020 | Perera | G06N 20/00 |
| 2020/0394506 A1* | 12/2020 | Louizos | G06N 7/005 |
| 2020/0394512 A1* | 12/2020 | Zhang | G06N 7/023 |
| 2021/0019541 A1* | 1/2021 | Wang | G06V 10/82 |
| 2021/0034918 A1* | 2/2021 | Schaefer | G06K 9/6256 |
| 2021/0042503 A1* | 2/2021 | Karras | G06V 40/168 |
| 2021/0048994 A1* | 2/2021 | Yu | G06N 3/0454 |
| 2021/0073955 A1* | 3/2021 | Zhang | G06T 5/009 |
| 2021/0097737 A1* | 4/2021 | Kim | G06T 11/006 |
| 2021/0103822 A1* | 4/2021 | Hegde | G16C 20/50 |
| 2021/0117733 A1* | 4/2021 | Mahto | G06N 3/0454 |
| 2021/0117774 A1* | 4/2021 | Choi | G06N 3/088 |
| 2021/0117815 A1* | 4/2021 | Creed | G06F 17/16 |
| 2021/0124999 A1* | 4/2021 | Dia | G06V 10/754 |
| 2021/0125107 A1* | 4/2021 | Condessa | G06N 3/08 |
| 2021/0157858 A1* | 5/2021 | Stevens | G06F 16/90335 |
| 2021/0166102 A1* | 6/2021 | Kim | G06N 5/041 |
| 2021/0224606 A1* | 7/2021 | Lee | G06N 3/0472 |
| 2021/0248727 A1* | 8/2021 | Fisher | G06T 5/50 |
| 2021/0264236 A1* | 8/2021 | Xu | G06V 10/764 |
| 2021/0312674 A1* | 10/2021 | Abrol | G06N 3/0472 |
| 2021/0319240 A1* | 10/2021 | Demir | G06V 10/454 |
| 2021/0326760 A1* | 10/2021 | Kumagai | G06N 3/0454 |
| 2021/0342570 A1* | 11/2021 | Gregson | G16H 50/70 |
| 2021/0342647 A1* | 11/2021 | Gou | G06V 20/56 |
| 2021/0350179 A1* | 11/2021 | Bello | G06N 3/0454 |
| 2021/0357376 A1* | 11/2021 | Jain | G06N 3/0454 |
| 2021/0358164 A1* | 11/2021 | Liu | G06T 7/73 |
| 2021/0358577 A1* | 11/2021 | Zhang | G06N 3/084 |
| 2021/0374525 A1* | 12/2021 | Bremer | G06K 9/6272 |
| 2021/0397895 A1* | 12/2021 | Sun | G06K 9/623 |
| 2021/0397973 A1* | 12/2021 | Ohta | G06N 3/088 |
| 2022/0012568 A1* | 1/2022 | Pardeshi | G06T 7/70 |
| 2022/0012609 A1* | 1/2022 | Gormally | G06N 5/04 |
| 2022/0013132 A1* | 1/2022 | Engel | G10L 25/30 |
| 2022/0028180 A1* | 1/2022 | Wong | G06K 9/6218 |
| 2022/0076135 A1* | 3/2022 | Chen | G06N 3/088 |
| 2022/0092411 A1* | 3/2022 | Shin | G06N 3/08 |
| 2022/0101122 A1* | 3/2022 | Vahdat | G06V 10/772 |
| 2022/0108122 A1* | 4/2022 | Sokhandan Asl | G06V 10/7753 |
| 2022/0108183 A1* | 4/2022 | Arpit | G06N 3/088 |
| 2022/0108195 A1* | 4/2022 | Kehler | G06F 40/30 |
| 2022/0108434 A1* | 4/2022 | Donahue | G06V 10/751 |
| 2022/0129712 A1* | 4/2022 | Sallee | G06K 9/6278 |
| 2022/0129758 A1* | 4/2022 | Sallee | G06N 3/088 |
| 2022/0138897 A1* | 5/2022 | Singh | G06T 3/4007 382/159 |
| 2022/0148188 A1* | 5/2022 | Hagi | G06N 3/0454 |
| 2022/0164346 A1* | 5/2022 | Mitra | G06F 16/2462 |
| 2022/0164921 A1* | 5/2022 | Noh | G06N 3/08 |
| 2022/0172050 A1* | 6/2022 | Dalli | G06N 3/08 |
| 2022/0189456 A1* | 6/2022 | Pang | G10L 13/027 |
| 2022/0198286 A1* | 6/2022 | Prat | G06V 10/82 |
| 2022/0235689 A1* | 7/2022 | Hanselmann | F01N 11/00 |
| 2022/0237905 A1* | 7/2022 | Olmeda Reino | G06V 10/7796 |
| 2022/0245322 A1* | 8/2022 | Lundin | G06F 40/253 |
| 2022/0253639 A1* | 8/2022 | Fan | G06K 9/629 |
| 2022/0254152 A1* | 8/2022 | Min | G06V 10/806 |
| 2022/0262108 A1* | 8/2022 | Hida | G06N 3/088 |
| 2022/0269937 A1* | 8/2022 | Kim | G06V 20/40 |
| 2022/0269943 A1* | 8/2022 | Szatmary | G06N 5/04 |
| 2022/0277187 A1* | 9/2022 | Wang | G06N 3/088 |
| 2022/0284316 A1* | 9/2022 | Bucher | G06V 20/69 |
| 2022/0292673 A1* | 9/2022 | Chitiboi | G06T 7/0012 |
| 2022/0301288 A1* | 9/2022 | Higuchi | G06F 21/57 |
| 2022/0308242 A1* | 9/2022 | Wang | G01T 1/36 |
| 2022/0309292 A1* | 9/2022 | Albrecht | G06K 9/6268 |
| 2022/0309341 A1* | 9/2022 | Brox | G06N 3/0481 |
| 2022/0318623 A1* | 10/2022 | Dehaene | G06N 3/08 |
| 2022/0327389 A1* | 10/2022 | AlRegib | G06N 3/0454 |
| 2022/0327675 A1* | 10/2022 | Okuno | G01N 15/00 |

FOREIGN PATENT DOCUMENTS

| | | |
|---|---|---|
| WO | 2017094267 A1 | 6/2017 |
| WO | 2016154298 A1 | 9/2019 |

OTHER PUBLICATIONS

S. Zhang, C. Gao, F. Chen, S. Luo and N. Sang, "Group Sparse-Based Mid-Level Representation for Action Recognition," in IEEE Transactions on Systems, Man, and Cybernetics: Systems, vol. 47, No. 4, pp. 660-672, Apr. 2017, doi: 10.1109/TSMC.2016.2625840. (Year: 2017).*

J. Berri, Y. Atif and R. Behlamri, "Time-dependent learning," IEEE International Conference on Advanced Learning Technologies, 2004. Proceedings., 2004, pp. 816-818, doi: 10.1109/ICALT.2004. 1357670. (Year: 2004).*

E. Haselsteiner and G. Pfurtscheller, "Using time-dependent neural networks for EEG classification," in IEEE Transactions on Rehabilitation Engineering, vol. 8, No. 4, pp. 457-463, Dec. 2000, doi: 10.1109/86.895948. (Year: 2000).*

A. Tavanaei and A. S. Maida, "Multi-layer unsupervised learning in a spiking convolutional neural network," 2017 International Joint Conference on Neural Networks (IJCNN), 2017, pp. 2023-2030, doi: 10.1109/IJCNN.2017.7966099. (Year: 2017).*

Shin Matsuo and Keiji Yanai. 2016. CNN-based Style Vector for Style Image Retrieval. In Proceedings of the 2016 ACM on International Conference on Multimedia Retrieval (ICMR '16). Association for Computing Machinery, New York, NY, USA, 309-312. https://doi.org/10.1145/2911996.2912057 (Year: 2016).*

Examination Report issued in corresponding European Patent Application No. 18808465.1, dated Sep. 23, 2022.

Gaetan Hadjeres et al: "GLSR-VAE: Geodesic Latent Space Regularization for Variational AutoEncoder Architectures", arxiv.org, Cornell University Library, 201 Olin Librar Ornell University Ithaca, NY 14853, XP080776843, DOI: 10.1109/SSCI.2017. 8280895, Jul. 14, 2017 (Jul. 14, 2017).

International Search Report and Written Opinion corresponding to PCT/GB2018/053287 dated Feb. 14, 2019.

International Search Report corresponding to PCT/GB2018/053287 dated Feb. 14, 2019.

(56) References Cited

OTHER PUBLICATIONS

Gaetan Hadjeres et al, "GLSR-VAE: Geodesic Latent Space Regularization for Variational AutoEncoder Architectures", arxiv.org, Cornell University Library, 201 Olin Library Cornell University Ithaca, NY 14853,Jul. 14, 2017 (Jul. 14, 2017).

Kamran Ghasedi Dizaji et al, "Deep Clustering via Joint Convolutional Autoencoder Embedding and Relative Entropy Minimization," Aug. 9, 2017 (Aug. 9, 2017), pp. 1-13.

Pascal Vincent et al, "Stacked Denoising Autoencoders: Learning Useful Representations in a Deep Network with a Local Denoising Criterion Pierre-Antoine Manzagol", Dec. 31, 2010 (Dec. 31, 2010), p. 3371-3408.

Examination Report issued in European Patent Application No. 18822112.1, dated Oct. 26, 2022, 5 pages.

Sebelius F C Pet Al: "Refined Myoelectric Control in Below-Elbow Amputees Using Artificial Neural Networks and a Data Glove", The Journal of Hand Sur, W.B. Saunders, Amsterdam, NL, vol. 30, No. 4, Jul. 1, 2005 (Jul. 1, 2005), pp. 780-789, XP004986588, ISSN: 0363-5023, DOI: 10.1016/J.JHSA.2005.01.002.

Office Action in Japanese Patent Application No. 2020-526409, dated Nov. 22, 2022.

Irina Higgins, Nicholas Sonnerat, Loic Matthey, Christopher P. Burgess, Matthew Botvinik, Demis Hassabis, Alexander Lerchner, "Scan: Learning Abstract Hierarchical Compositional Visual Concepts", DeepMind 2017, 12 pages, retrieved online at: https://github.com/miyosuda/scan.

Ryosuke Tachibana, Takashi Matsubara, Kuniaki Uebara, "Label Estimation and Semi-Supervised Learning Using Adversarial Networks in Deep Learning", Department of Computer Science and Systems Engineering, Graduate School of System Informatics, Kobe University, the 30th Annual Conference of the Japanese Society for Artificial Intelligence, 5 pages, 2016, retrieved online: tachibana@gai.cs.kube-u.ac.jp.

\* cited by examiner

TIME INVARIANT CLASSIFICATION

This application is a U.S. National Stage entry under 35 U.S. C. § 371 based on International Application PCT/GB2018/053287, filed on Nov. 13, 2018 which claims the benefit of priority to 1718756.8, filed on Nov. 13, 2018, which claims the benefit of priority to 1719257.6, filed Nov. 20, 2017 which is incorporated herein by reference in its entirety.

The present application relates to a system, apparatus and method(s) for a time invariant classification.

BACKGROUND

When systems use machine learning (ML) techniques to perform classification of time varying input data signal(s), well labelled training data is generally required for a robust system that reliably classifies the input signal(s). For most applications, well labelled training datasets are not available a priori and need to be generated, which can be a difficult time consuming process. Semi-supervised and/or unsupervised ML technique(s) may be employed to alleviate some of the difficulty in generating well labelled data and/or a reliable classification system for classifying time varying input data signal(s).

With high frequency, time varying input data signal(s) (e.g. neurological signal(s)) even semi-supervised and/or unsupervised ML technique(s) may too struggle to perform classification of such signal(s) reliably. This is due to the high volumes of sequential data that results from sampling the high frequency time varying input data signal(s) to ensure most, if not all, the information contained in the high frequency time varying input data signal(s) are retained. Further, such high frequency time varying input data signal(s) are generally poorly labelled or even unlabelled due to the high fidelity required in determining what is exactly occurring at each labelling instance.

Labelling such high frequency time varying input data signal(s) may require at least one or more sensor(s) trained on a subject or object and capable of outputting sensor data at the same rate for use in establishing a plurality of true state or class labels or ground truth states/classes for the input data signal(s). In addition, true state or class labels for high frequency time varying input data signal(s) are generally expensive and/or difficult to capture accurately and are usually generated with the help of a separate system. For example, when analysing neurological signal(s) in relation to movement of the subject, the subject's posture may be analysed using motion or skeletal tracking systems such as, by way of example only but not limited to, a Vicon (RTM) motion capture system or Kinetic (RTM).

FIG. 1a to 1c illustrate some common issue(s) that may be encountered by ML technique(s) attempting to classify high frequency time varying input data signal(s). FIG. 1a is a schematic diagram that illustrates classification and/or task/class labelling 100 for high frequency time varying input data signal(s) 102, which in this example may be one or more neurological signal(s). The states marked with a "?" indicate that a state label is unknown, so these may require task/class labelling. Although the high frequency time varying input data signal(s) 102 may be described herein as one or more neurological signal(s), this is by way of example only and not limited to this type of signal, but it is to be appreciated by the skilled person that the description herein applies to any type of high frequency time varying input data signal(s) 102.

In FIG. 1a, the one or more neurological signal(s) 102 are partitioned in time into a plurality of contiguous time intervals, in which the neurological signal(s) 102 are sampled in each of the contiguous time intervals to produce a plurality of contiguous neural sample data sequences 104a to 104l. Each sequence 104a-104l corresponding to one of the contiguous time intervals. Each of the contiguous time intervals of the neurological signal(s) 102 may correspond to one or more true state(s) or class label(s) $S_1$-$S_n$ (also known as ground truth states/classes/task labels) that may describe a portion of the information content (or information of interest) of the neurological signal(s) during that time interval. For example, state $S_1$ corresponds to when the neurological signal(s) indicate a subject 106 is hopping, stage $S_2$ corresponds to when the neurological signal(s) indicate a subject 106 is performing a "downward dog" yoga pose, state $S_3$ corresponds to when the neurological signal(s) indicate a subject 106 is performing a leap manoeuvre and so on.

Furthermore, the number of known states $S_1$-$S_n$ may be unreliable or sparse, that is they may not be well known or defined in advance. There may also be an unknown but possible predictive relationship between the neurological signal(s) 102 in each time interval and one or more particular states $S_1$ to $S_n$ and also one or more unknown states. ML techniques may be used to learn this unknown relationship and assist in classifying not only neurological signal(s) 102 to each state $S_1$ to $S_n$ but also for finding further unknown states for creating more reliable and dense states or true state labels.

As illustrated in FIG. 1a, each neural sample data sequence 104a-104l corresponds to one of the contiguous time intervals. The plurality of contiguous neural sample data sequences 104a to 104l forms a time series of neural sample data sequences of one or more dimensions. For example, if the one or more neurological signal(s) 102 correspond to a multi-channel neurological signal with M channels, then the plurality of contiguous neural sample data sequences 104a to 104l would be a time series of neural data samples of dimension M. Given there is an unknown but possible predictive relationship between the plurality of contiguous neural sample data sequences 104a to 104l and a particular state $S_1$ to $S_n$, these may be input to a ML technique for classification.

As a result, the ML technique may output a corresponding plurality of time-dependant state estimate label vectors $\gamma_1$, $\gamma_2$, ..., $\gamma_{12}$ in a latent space of dimension N, where N is an arbitrary number that may depend on the number of states or classes that are used to classify the neural sample data sequences 104a to 104l. It may be that different label vectors $\gamma_1, \gamma_2, \ldots, \gamma_{12}$ may belong to the same true state $S_1$-$S_n$. For example, in FIG. 1a, the label vector $\gamma_1$ belongs to true state $S_3$, label vectors $\gamma_2, \gamma_3, \gamma_8$ and $\gamma_{11}$ (where $\gamma_n$ is not necessarily equal to $\gamma_{n+x}$, but $\gamma_n$ and $\gamma_{n+1}$ are adjacent in time) belong to the same true state $S_1$, and label vector $\gamma_7$ belongs to true state $S_3$, whilst other label vectors $\gamma_4, \ldots, \gamma_6$ and $\gamma_9, \gamma_{10}$, and $\gamma_{12}$ have unknown true states.

One way to classify label vectors output from an ML technique may be to identify clusters of label vectors $\gamma_1, \gamma_2, \ldots, \gamma_{12}$ and those within a cluster may be assigned the same state. This is easier said than done. One or more regions or boundaries within the vector space of the label vectors $\gamma_1, \gamma_2, \ldots, \gamma_{12}$ may be defined and assigned one or more states $S_1$-$S_{11}$. A ML technique may then assume that those label vectors $\gamma_1, \gamma_2, \ldots \gamma_{12}$ that cluster within a region or boundary belong to the state assigned to that region or boundary. However, it may be that the regions and boundaries are defined poorly such that label vectors $\gamma_1, \gamma_2, \ldots, \gamma_{12}$ belonging to different states cluster together depending on the circumstances. This creates ambiguity and it is difficult to classify such labels.

Alternatively, with poorly labelled data or unlabelled data, it may be necessary to determine whether the label vectors $\gamma_1, \gamma_2, \ldots, \gamma_{12}$ cluster at all and whether those clustered label vectors $\gamma_1, \gamma_2, \ldots, \gamma_{12}$ are associated with the same true state. If not, then any ML technique will have trouble classifying or make errors classifying label vectors $\gamma_1, \gamma_2, \ldots, \gamma_{12}$ that may cluster in the same region but which actually belong to different states. This is also an ongoing problem.

Some of these problems or ambiguities may arise for semi-supervised or unsupervised ML technique(s) and may inadvertently, due to design or misapplication, put too much weight on recent/previous contiguous or adjacent time intervals of the high frequency time varying input data signal(s). This may then mean that adjacent neural sample data sequences 104a to 104l may be more heavily weighted thus adjacent vector labels $\gamma_1, \gamma_2, \ldots, \gamma_{12}$ that belong to different states may become correlated. This can severely and adversely influence the classification of each time interval of a high frequency time varying input data signal 102.

FIG. 1b illustrates the example classification 100 of FIG. 1a in which two random time windows 106a and 106b (e.g. $TW_N$ and $TW_{N+1}$). FIG. 1c is a schematic diagram illustrating an example cluster diagram 110 showing clustering of the vector labels $\gamma_1, \gamma_2, \ldots, \gamma_{12}$ in cluster regions 112, 114, and 116 for time windows 106a and 106b. In both time windows 106a and 106b, vector labels that belong to different true states have clustered together.

At time window 106a, vector labels $\gamma_2$, $\gamma_3$ and $\gamma_4$ have clustered together in cluster region 112 in which vector labels $\gamma_2$ and $\gamma_4$ belong to true state $S_1$ and vector label $\gamma_3$ belongs to true state $S_2$. The cluster region 112 has mixed true states $S_1$ and $S_2$, so a classifier would make inaccurate classifications of the vector labels. At time window 106b, vector labels $\gamma_7$, $\gamma_8$ and $\gamma_9$ have clustered together in cluster region 114 in which vector labels $\gamma_7$ and $\gamma_9$ belong to true state $S_2$ and vector label $\gamma_8$ belongs to true state $S_1$. The cluster region 114 also has mixed true states $S_1$ and $S_2$, so a classifier in this time instance would be making further inaccurate classifications of the vector labels.

It is also noticeable that at time window 106a the vector labels $\gamma_2$ and $\gamma_4$ that belong to true state $S_1$ are in a very different position compared with vector label $\gamma_8$ at time window 106b that also belongs to true state $S_1$. Similarly, at time window 106a the vector label $\gamma_3$ belongs to true state $S_2$ is in a very different position compared with vector labels $\gamma_7$ and $\gamma_9$ at time window 106b that belong to true state $S_2$. Ideally, vector labels that belong to the same state should cluster within the same cluster region over multiple time windows.

FIG. 1a to 1c illustrate a scenario in which a ML technique outputs vector labels that cluster together but which belong to different states. This may be caused by temporal correlation between adjacent neural sample data sequences 104a to 104l, which may be caused by the ML technique over representing the occurrence of a "temporal pattern" within the neural sample data sequences 104a to 104l. Even though cluster regions 112 or 114 might be split to solely include vector labels belonging to the same state, this also leads to overfitting of the ML technique and a less robust classifier or a classifier that is very sensitive to changes in the high frequency time varying input data signal(s) 102. Simply put, different states that are adjacent in time should map to different cluster regions. Similarly, different vector labels that are with in different cluster regions should map to different states.

There is a desire for a mechanism for assisting ML technique(s) in the generation of improved labelled datasets from poorly labelled or unlabelled datasets, for reducing classifier error through temporal correlation between adjacent time intervals of a high frequency time varying input data signal(s) 102 and improving the robustness of ML classification techniques.

The embodiments described below are not limited to implementations which solve any or all of the disadvantages of the known approaches described above.

SUMMARY

This Summary is provided to introduce a selection of concepts in a simplified form that are further described below in the Detailed Description. This Summary is not intended to identify key features or essential features of the claimed subject matter, nor is it intended to be used to determine the scope of the claimed subject matter.

The present disclosure provides methods and apparatus for a machine learning technique that uses a latent vector from a latent vector space in classifying input data, where the latent vector includes a label vector y and a style vector z in which at least a part of the style vector z is regularised causing the machine learning technique to output label vectors y that are substantially time invariant, time invariant, or more time invariant that compared with when the machine learning technique does not regularise the style vector z.

In a first aspect, the present disclosure provides a computer implemented method for training an autoencoder, the autoencoder outputting a latent vector of an N-dimensional latent space for classifying input data, the latent vector comprising a label vector y and a style vector z, the method comprising regularising the style vector z during training for effecting time invariance in the set of label vectors y associated with the input data.

Preferably, the computer implemented method wherein regularising the style vector z is based on a selected one or more probability distribution(s) $P(A_i)$ and corresponding one or more vector(s) $A_i$, wherein the style vector z comprises the one or more vector(s) $A_i$.

Preferably, the computer implemented method wherein regularising the style vector z further comprises training an encoder network of the autoencoder with input training data to enforce a selected probability distribution on at least a portion of the style vector z.

Preferably, the computer implemented method wherein regularising the style vector z increases the time invariance of the set of label vectors y during training.

Preferably, the computer implemented method wherein regularising the style vector z further comprising, prior to training the autoencoder: selecting a number of one or more vector(s) $A_i$ for partitioning the style vector z; selecting a number of one or more probability distribution(s) $P(A_i)$ corresponding to the selected vector(s) $A_i$; and regularising the style vector z further comprises regularising each of the selected vector(s) $A_i$ based on the corresponding selected probability distribution $P(A_i)$, wherein the style vector z is partitioned into the selected vector(s) $A_i$.

Preferably, the computer implemented method wherein regularising z further comprises retrieving a set of hyperparameters comprising one or more selected probability distribution(s) $P(A_i)$ and corresponding one or more selected vector(s) $A_i$ partitioning the style vector z, wherein said set of hyperparameters defines an autoencoder structure that can be trained to output substantially time invariant label vector(s) y by regularising style vector z during training based on the one or more selected probability distribution(s) $P(A_i)$ and corresponding one or more selected vector(s) $A_i$.

Preferably, the computer implemented method wherein regularising the style vector z during training causes the label vectors y associated with input data to form multiple or two or more clusters of label vectors y, wherein each contains a subgroup of label vectors y that are substantially the same or similar, and the set of label vectors y are substantially time invariant.

Preferably, the computer implemented method wherein each cluster is defined by a region or boundary and the subgroup of label vectors y for each cluster are contained within the defined region or boundary, and label vectors y are substantially the same or similar when they are contained within the region or boundary of the same cluster, wherein the cluster relates to a true state or class label.

Preferably, the computer implemented method further comprising: clustering the set of label vectors y to form multiple clusters of label vectors y in which each cluster contains a subgroup of label vectors y that are substantially the same or similar; and mapping each of the clusters of label vectors y to a class or state label from a set of class or state labels S associated with the input data for use by the trained autoencoder in classifying input data.

Preferably, the computer implemented method wherein the input data comprises input data based on one or more high frequency time varying input signal(s).

Preferably, the computer implemented method wherein the input data comprises neural sample data associated with one or more neurological signal(s).

Preferably, the computer implemented method wherein the autoencoder further comprises: a latent representation layer for outputting a style vector, z, of the latent space, wherein the style vector z comprises the one or more selected vector(s) $A_i$; and one or more regularising network(s), each regularising network comprising an input layer and a discriminator network comprising one or more hidden layer(s) and an output layer for outputting and/or evaluating a generator loss function, $L_{GAi}$, wherein the input layer is connected to a corresponding one of the one or more selected vector(s) $A_i$ of style vector z; the method further comprising: regularising the latent vector z, further comprising, for each of the regularising network(s): training said each regularising network to distinguish between the corresponding vector $A_i$ of latent vector, z, and a sample vector generated from the corresponding selected probability distribution $P(A_i)$, wherein the sample vector is of the same dimension as vector $A_i$ of the latent vector, z; outputting the generator loss function value, $L_{GAi}$, for use by the autoencoder in training an encoder network to enforce the probability distribution $P(A_i)$ on the vector $A_i$ of the latent vector z.

Preferably, the computer implemented method wherein the autoencoder further comprises: the latent representation layer outputting the label vector, y, of the latent space; and an adversarial network coupled comprising an input layer, one or more hidden layer(s), and an output layer for outputting and/or evaluating an generator loss function, $L_{GY}$, associated with label vector y, wherein the input layer of the adversarial network is connected to the label vector, y; the method further comprising: training the adversarial network to distinguish between label vectors, y, generated by the latent representation layer and sample vectors from a categorical distribution of a set of one hot vectors of the same dimension as the label vector, y; and outputting the generator loss function value, $L_{GY}$, associated with label vector y for use by the autoencoder in training an encoder network to enforce the categorical distribution on the label vector y.

Preferably, the computer implemented method, the autoencoder further comprising a decoding network coupled to the latent representation layer, wherein the training set of input data comprises a training set of neurological sample vector sequences $\{(x_i)^k\}_{k=1}^T$, where $1 \le i \le L_k$ and $1 \le k \le T$, in which $L_k$ is the length of the k-th neurological sample vector sequence and T is the number of training neurological sample vector sequences, for each k-th neurological sample vector sequence corresponding to a k-th neural activity that is passed through the autoencoder, the method further comprising: generating a loss or cost function based on the output of the one or more regularising networks and/or the adversarial network, an estimate of k-th neurological sample vector sequence represented as $(\hat{x}_i)^k$ output from the decoding network, the original k-th neurological sample vector sequence $(x_i)^k$; and updating the weights of the hidden layer(s) of the encoding network and/or decoding network based on the generated loss of cost function.

In a second aspect, the present disclosure provides a computer implemented method for optimizing an autoencoder, the autoencoder outputting a latent vector of an N-dimensional latent space for classifying input data, the latent vector comprising a label vector y and a style vector z, the method comprising controlling the regularization of style vector z to increase or decrease the time invariance of the label vectors y.

Preferably, the computer implemented method wherein controlling the regularisation of style vector z comprises: selecting one or more probability distribution(s) $P(A_i)$ and corresponding one or more vector(s) $A_i$, wherein the style vector z comprises the one or more vector(s) $A_i$, and regularising style vector z based on the selected probability distribution(s).

Preferably, the computer implemented method wherein regularising style vector z further comprises training an encoder network of the autoencoder with input training data to enforce a selected probability distribution on at least a portion of the style vector z.

Preferably, the computer implemented method further comprising controlling the regularization of style vector z to increase the time invariance of the set of label vectors y compared to a corresponding set of label vectors y output from an autoencoder without regularization.

Preferably, the computer implemented method wherein controlling the regularisation of style vector z further comprising: selecting a number of one or more vector(s) $A_i$ for partitioning the style vector z; selecting a number of one or more probability distribution(s) $P(A_i)$ corresponding to the selected vector(s) $A_i$; and regularizing the style vector z based on the selected vector(s) $A_i$ and selected probability distribution(s) $P(A_i)$ further comprises regularizing each of the selected vector(s) $A_i$ based on the corresponding selected probability distribution $P(A_i)$, wherein the style vector z is a concatenation of the selected one or more vectors $A_i$.

Preferably, the computer implemented method wherein there are a multiple vectors $A_i$, or a plurality of vectors $A_i$, that are selected to partition the style vector z.

Preferably, the computer implemented method wherein the regularisation of z is controlled over a plurality of training cycles of the autoencoder.

Preferably, the computer implemented method wherein controlling the regularisation of z further comprises: generating a plurality of sets of hyperparameters, each set of hyperparameters comprising one or more selected probability distribution(s) $P(A_i)$ and corresponding one or more selected vector(s) $A_i$ partitioning the style vector z, wherein said each set of hyperparameters defines an autoencoder structure; for each set of hyperparameters of the plurality of sets of hyperparameters, determining the clustering and time invariance performance of the label vector y of the autoencoder by: configuring the autoencoder based on the set of hyperparameters; regularizing the style vector z based on the set of hyperparameters by training the configured autoencoder on input data; generating a set of label vectors y based on the trained autoencoder and input data; determining multiple or two or more clusters of the label vectors y; detect whether each cluster contains a subgroup of label vectors y that are substantially the same or similar; in response to detecting that each cluster contains a subgroup of label vectors y that are substantially the same or similar, detecting whether the set of label vectors y are substantially time invariant; and in response to detecting that each cluster contains a subgroup of label vectors y that are substantially the same or similar and detecting that the set of label vectors y are substantially time invariant, storing the selected set of hyperparameters in an optimised hyperparameter dataset, wherein said each set of hyperparameters in the optimised hyperparameter dataset defines an autoencoder structure that can be trained to output substantially time invariant label vector(s) y by regularising style vector z during training.

Preferably, the computer implemented method wherein each cluster is defined by a region or boundary and the subgroup of label vectors y for each cluster are contained within the defined region or boundary, and label vectors y are substantially the same or similar when they are contained within the region or boundary of the same cluster.

Preferably, the computer implemented method further comprising: clustering the set of label vectors y to form multiple clusters of label vectors y in which each cluster contains a subgroup of label vectors y that are substantially the same or similar; and mapping each of the clusters of label vectors y to a class or state label from a set of class or state labels S associated with the input data for use by an autoencoder defined by the set of hyperparameters in classifying input data.

Preferably, the computer implemented method further comprising: storing a set of autoencoder configuration data in an optimised autoencoder configuration dataset, the set of autoencoder configuration data comprising data representative of one or more from the group of: data representative of the set of hyperparameters stored in the optimised hyperparameter dataset; data representative of the clusters of label vectors y; data representative of the mapping of each of the clusters of label vectors y to class or state labels S; and data representative of the weights and/or parameters of one or more neural network(s) and/or hidden layer(s) associated with the trained autoencoder.

Preferably, the computer implemented method further comprising: selecting a set of autoencoder configuration data from the optimised autoencoder configuration dataset; configuring an autoencoder based on the set of autoencoder configuration data, wherein the autoencoder outputs a latent vector of an N-dimensional latent space for classifying input data, the latent vector comprising a label vector y and a style vector z, wherein the autoencoder is configured based on data representative of the weights and/or parameters of one or more neural network(s) and/or hidden layer(s) associated with the trained autoencoder of the set of autoencoder configuration data, wherein the trained autoencoder regularised the style vector z and outputs substantially time invariant label vector(s) y.

Preferably, the computer implemented method wherein the set of hyperparameters further comprises one or more from the group of: autoencoder size, wherein the autoencoder size comprises a length of the encoder state; initial learning rate or decay; batch size, wherein batch size comprises the number of samples and defines the update of weights or parameters of the autoencoder neural network or hidden layer(s); size of the label vector y; number of classes or states associated with the label vector y; number of hidden layer(s), neural network cells, and/or long short term memory cells; feed size, wherein feed size comprises the number of time steps per data point or batch; loss weighting coefficient, wherein the loss weighting coefficient comprises a relative weighting to give to generative and discriminative losses when the autoencoder uses a discriminator and/or a generator neural network components; optimisation function for optimising the weights of the autoencoder neural network structure(s); type of weight update algorithm or procedure of the weights of the autoencoder neural network structure(s); learning rate decay factor, wherein learning rate decay factor is used to adjust learning rate when the loss associated with a loss cost function of the autoencoder plateaus or stagnates; and one or more performance checkpoint(s) for determining how often learning rate is to be adjusted.

Preferably, the computer implemented method further comprising: retrieving a selected one or more probability distributions and a selected one or more vector(s) $A_i$ in which the regularization of style vector z based on the retrieved probability distribution(s) and corresponding vector(s) $A_i$ increases the time invariance of the label vector y compared with when style vector z is not regularized during training; configuring a regularisation component of the second autoencoder based on the retrieved probability distribution(s) and corresponding vector(s) $A_i$; training the second autoencoder and regularizing latent vector z based on an input dataset for generating a set of label vectors y, wherein the set of label vectors y map to a set of states or class labels associated with the input data; classifying further data by inputting the further data to the trained second autoencoder and mapping output label vectors y to the set of states or class labels, wherein the output label vectors y are substantially time invariant based on the retrieved probability distribution(s) and corresponding vector(s) $A_i$.

Preferably, the computer implemented method wherein the input data comprises input data based on one or more high frequency time varying input signal(s).

Preferably, the computer implemented method wherein the input data comprises neural sample data associated with one or more neurological signal(s).

Preferably, the computer implemented method wherein the autoencoder further comprises: a latent representation layer for outputting a style vector, z, of the latent space, wherein the style vector z comprises the one or more selected vector(s) $A_i$; and one or more regularising network(s), each regularising network comprising an input layer and a discriminator network comprising one or more hidden layer(s) and an output layer for outputting and/or evaluating a generator loss function, $L_{GAi}$, wherein the input layer is connected to a corresponding one of the one or more selected vector(s) $A_i$ of style vector z; the method further comprising: regularising the latent vector z, further comprising, for each of the regularising network(s): raining said each regularising network to distinguish between the corresponding vector $A_i$ of latent vector, z, and a sample vector generated from the corresponding selected probability distribution $P(A_i)$, wherein the sample vector is of the same dimension as vector $A_i$ of the latent vector, z; outputting the generator loss function value, $L_{GAi}$, for use by the autoencoder in training an encoder network to enforce the probability distribution $P(A_i)$ on the vector $A_i$ of the latent vector z.

Preferably, the computer implemented method wherein the autoencoder further comprises: the latent representation layer outputting the label vector, y, of the latent space; and an adversarial network coupled comprising an input layer, one or more hidden layer(s), and an output layer for outputting and/or evaluating an generator loss function, $L_{GY}$, associated with label vector y, wherein the input layer of the adversarial network is connected to the label vector, y; the method further comprising: training the adversarial network to distinguish between label vectors, y, generated by the latent representation layer and sample vectors from a categorical distribution of a set of one hot vectors of the same dimension as the label vector, y; and outputting the generator loss function value, $L_{GY}$, associated with label vector y for use by the autoencoder in training an encoder network to enforce the categorical distribution on the label vector y.

Preferably, the computer implemented method the autoencoder further comprising a decoding network coupled to the latent representation layer, wherein the training set of input data comprises a training set of neurological sample vector sequences $\{(x_i)^k\}_{k=1}^T$, where $1 \le i \le L_k$ and $1 \le k \le T$, in which $L_k$ is the length of the k-th neurological sample vector sequence and T is the number of training neurological sample vector sequences, for each k-th neurological sample vector sequence corresponding to a k-th neural activity that is passed through the autoencoder, the method further comprising: generating a loss or cost function based on the output of the one or more regularising networks and/or the adversarial network, an estimate of k-th neurological sample vector sequence represented as $(\hat{x}_i)^k$ output from the decoding network, the original k-th neurological sample vector sequence $(x_i)^k$; and updating the weights of the hidden layer(s) of the encoding network and/or decoding network based on the generated loss of cost function.

Preferably, the computer implemented method wherein each probability distribution of the selected one or more probability distributions comprises one or more probability distributions or combinations thereof from the group of: a Laplacian; Gamma; Normal distribution; a Gaussian distribution; a Log-normal distribution; a bimodal distribution; a uniform distribution; a multimodal distribution; a multinomial distribution; a multivariate distribution; permutations of two or more of the aforementioned distributions; permutations of two or more of the aforementioned distributions with different properties such as mean and/or variance; and any other probability distribution that contributes to the time invariance of the label vector(s) y associated with the input data.

In a third aspect, the present disclosure provides a computer implemented method for an autoencoder, the autoencoder outputting a latent vector of an N-dimensional latent space for classifying input data, the latent vector comprising a label vector y and a style vector z, the method comprising: retrieving data representative of a trained autoencoder structure in which the style vector z is regularised during training ensuring one or more label vector(s) y are substantially time invariant; configuring the autoencoder based on the retrieved autoencoder structure; and classifying one or more label vector(s) y associated with the input data, wherein the one or more label vector(s) y are substantially time invariant.

Preferably, the computer implemented method wherein the autoencoder structure is based on an autoencoder trained in accordance the method as described herein and/or described with reference to the first aspect.

Preferably, the computer implemented method wherein the autoencoder structure is based on an autoencoder optimised and/or trained in accordance the method as described herein and/or described with reference to the second aspect.

In a fourth aspect, the present disclosure provides an apparatus comprising: a communications interface; a memory unit; and a processor unit, the processor unit connected to the communications interface and the memory unit, wherein the processor unit, storage unit, communications interface are configured to perform the method as described herein and/or described with reference to the first aspect.

In a fifth aspect, the present disclosure provides an apparatus comprising: a communications interface; a memory unit; and a processor unit, the processor unit connected to the communications interface and the memory unit, wherein the processor unit, storage unit, communications interface are configured to perform the method as described herein and/or described with reference to the second aspect.

In a sixth aspect, the present disclosure provides an apparatus comprising: a communications interface; a memory unit; and a processor unit, the processor unit connected to the communications interface and the memory unit, wherein the processor unit, storage unit, communications interface are configured to perform the method as described herein and/or described with reference to the third aspect.

In a seventh aspect, the present disclosure provides a computer readable medium comprising program code stored thereon, which when executed on a processor, causes the processor to perform a method as described herein and/or described with reference to the first aspect.

In a seventh aspect, the present disclosure provides a computer readable medium comprising program code stored thereon, which when executed on a processor, causes the processor to perform a method as described herein and/or described with reference to the second aspect.

In a eighth aspect, the present disclosure provides a computer readable medium comprising program code stored thereon, which when executed on a processor, causes the processor to perform a method as described herein and/or described with reference to the third aspect.

In a ninth aspect, the present disclosure provides an apparatus comprising: an encoding network; a decoding network; a latent representation layer for outputting a style vector, z, and an output label vector y of the latent space, wherein the style vector z comprises one or more selected vector(s) $A_i$ corresponding with one or more selected probability distribution(s) and the output of the encoding network is connected to the latent representation layer, and the latent representation layer is connected to the input of the decoding network; and a regularisation component connected to the latent representation layer, the regularisation component configured for regularising the style vector z during training of the apparatus and effecting a substantially time invariant output label vector y when the apparatus classifies input data.

Preferably, the apparatus wherein the regularisation component further comprising: one or more regularising network(s), each regularising network comprising an input layer and a discriminator network comprising one or more hidden layer(s) and an output layer for outputting a generator loss function, $L_{GAi}$, wherein the input layer is connected to a corresponding one of the one or more selected vector(s) $A_i$ of style vector z; wherein: each of the regularising network(s) is configured, during training, for: training the discriminator network to distinguish between the corresponding vector $A_i$ of latent vector, z, and a sample vector generated from the corresponding selected probability distribution $P(A_i)$, wherein the sample vector is of the same dimension as vector $A_i$ of the latent vector, z; and outputting the generator loss function value, $L_{GAi}$, for training the encoder network to enforce the probability distribution $P(A_i)$ on the vector $A_i$ of the latent vector z.

Preferably, the apparatus wherein the autoencoder further comprises: an adversarial network coupled comprising an input layer, one or more hidden layer(s), and an output layer for outputting an generator loss function, $L_{GY}$, associated with label vector y, wherein the input layer of the adversarial network is connected to the label vector, y; wherein the adversarial network is configured, during training, for: training the one or more hidden layer(s) to distinguish between label vectors, y, and sample vectors from a categorical distribution of a set of one hot vectors of the same dimension as the label vector, y; and outputting the generator loss function value, $L_{GY}$, associated with label vector y for training the encoder network to enforce the categorical distribution on the label vector y.

In a tenth aspect, the present disclosure provides a computer implemented method for an autoencoder, the autoencoder outputting a latent vector of an N-dimensional latent space for classifying input data, the latent vector comprising a label vector y and a style vector z, the method comprising controlling the regularization of style vector z to increase or decrease the time invariance of the label vectors y by selecting one or more probability distribution(s) $P(A_i)$ and corresponding one or more vector(s) $A_i$, wherein the style vector z comprises the one or more vector(s) $A_i$, and regularising style vector z based on the selected probability distribution(s), the method of controlling further comprising: generating a plurality of sets of hyperparameters, each set of hyperparameters comprising one or more selected probability distribution(s) $P(A_i)$ and corresponding one or more selected vector(s) $A_i$ partitioning the style vector z, wherein said each set of hyperparameters defines an autoencoder structure; for each set of hyperparameters of the plurality of sets of hyperparameters, determining the clustering and time invariance performance of the label vector y of the autoencoder by: configuring the autoencoder based on the set of hyperparameters; regularizing the style vector z based on the set of hyperparameters by training the configured autoencoder on input data; generating a set of label vectors y based on the trained autoencoder and input data; determining multiple or two or more clusters of the label vectors y; detect whether each cluster contains a subgroup of label vectors y that are substantially the same or similar; in response to detecting that each cluster contains a subgroup of label vectors y that are substantially the same or similar, storing the selected set of hyperparameters in an optimised hyperparameter dataset, wherein said each set of hyperparameters in the optimised hyperparameter dataset defines an autoencoder structure that can be trained to output substantially time invariant label vector(s) y by regularising style vector z during training.

Preferably, the computer implemented method further comprising: in response to detecting that each cluster contains a subgroup of label vectors y that are substantially the same or similar, detecting whether the set of label vectors y are substantially time invariant; and in response to detecting that each cluster contains a subgroup of label vectors y that are substantially the same or similar and detecting that the set of label vectors y are substantially time invariant, storing the selected set of hyperparameters in an optimised hyperparameter dataset, wherein said each set of hyperparameters in the optimised hyperparameter dataset defines an autoencoder structure that can be trained to output substantially time invariant label vector(s) y by regularising style vector z during training.

Preferably, the computer implemented method wherein each cluster is defined by a region or boundary and the subgroup of label vectors y for each cluster are contained within the defined region or boundary, and label vectors y are substantially the same or similar when they are contained within the region or boundary of the same cluster.

Preferably, the computer implemented method further comprising: clustering the set of label vectors y to form multiple clusters of label vectors y in which each cluster contains a subgroup of label vectors y that are substantially the same or similar; and mapping each of the clusters of label vectors y to a class or state label from a set of class or state labels S associated with the input data for use by an autoencoder defined by the set of hyperparameters in classifying input data.

Preferably, the computer implemented method further comprising: storing a set of autoencoder configuration data in an optimised autoencoder configuration dataset, the set of autoencoder configuration data comprising data representative of one or more from the group of: data representative of the set of hyperparameters stored in the optimised hyperparameter dataset; data representative of the clusters of label vectors y; data representative of the mapping of each of the clusters of label vectors y to class or state labels S; and data representative of the weights and/or parameters of one or more neural network(s) and/or hidden layer(s) associated with the trained autoencoder.

Preferably, the computer implemented method or apparatus of any of the aspects wherein regularising the style vector z further comprises regularising a portion of the style vector z.

Preferably, the computer implemented method or apparatus of any of the aspects wherein regularising the style vector z further comprises regularising a section of the style vector z.

Preferably, the computer implemented method or apparatus of any of the aspects wherein regularising the style vector z further comprises regularising a subvector of the style vector z.

Preferably, the computer implemented method or apparatus of any of the aspects wherein the subvector of the style vector z comprises a subgroup of the selected vectors Ai.

Preferably, the computer implemented method or apparatus of any of the aspects wherein the length of the subvector of the style vector z is less than the length of the style vector z.

Preferably, the computer implemented method or apparatus of any of the aspects wherein the style vector z is partially regularised.

Preferably, the computer implemented method or apparatus of any of the aspects wherein the style vector z is wholly regularised.

Preferably, the computer implemented method or apparatus of any of the aspects wherein regularising the style vector z further comprises: selecting a subgroup of the selected vector(s) $A_i$ and corresponding selected probability distributions P($A_i$), and regularising only the subgroup of the selected vector(s) $A_j$ of the style vector z, wherein the number of vector(s) $A_j$ in the subgroup of vector(s) $A_j$ is less than the selected number of vector(s) $A_i$.

Preferably, the computer implemented method or apparatus of any of the aspects, when the label vector y is not constrained or restricted by an adversarial network, wherein the autoencoder further comprises: the latent representation layer outputting the label vector, y, of the latent space; and an classification component or technique coupled to the label vector y for operating on and classifying the label vector y.

Preferably, the computer implemented method or apparatus of any of the aspects, wherein the label vector y is a soft vector.

Preferably, the computer implemented method or apparatus of any of the aspects, wherein the label vector y is not a one-hot like vector.

Preferably, the computer implemented method or apparatus of any of the aspects, wherein the label vector y is a dense soft vector.

Preferably, the computer implemented method of the first, second or third aspect wherein the label vector y comprises a vector, a tensor or otherwise, wherein the vector, tensor or otherwise comprises at least one or more from the group of: a one hot vector; a measure of entropy; be regularized to L1 L2 or both or other norms; a discrete boltzmann distributed vector; a representation of a prior class state; a known feature or configuration set.

Preferably, the computer implemented method of the first, second or third aspect wherein the style vector z comprises a vector, a tensor or otherwise, wherein the vector, tensor or otherwise is penalised or regularised by at least one or more from the group of: a probability distribution; L1 L2 or both, or other norms; nuisance variables; and error variables.

The methods described herein may be performed by software in machine readable form on a tangible storage medium e.g. in the form of a computer program comprising computer program code means adapted to perform all the steps of any of the methods described herein when the program is run on a computer and where the computer program may be embodied on a computer readable medium. Examples of tangible (or non-transitory) storage media include disks, thumb drives, memory cards etc. and do not include propagated signals. The software can be suitable for execution on a parallel processor or a serial processor such that the method steps may be carried out in any suitable order, or simultaneously.

This application acknowledges that firmware and software can be valuable, separately tradable commodities. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

The preferred features may be combined as appropriate, as would be apparent to a skilled person, and may be combined with any of the aspects of the invention.

BRIEF DESCRIPTION OF THE DRAWINGS

Embodiments of the invention will be described, by way of example, with reference to the following drawings, in which:

FIG. 1b is a schematic diagram illustrating the example classification of the high frequency time varying input data signal(s) according to FIG. 1a;

Figure 1A:
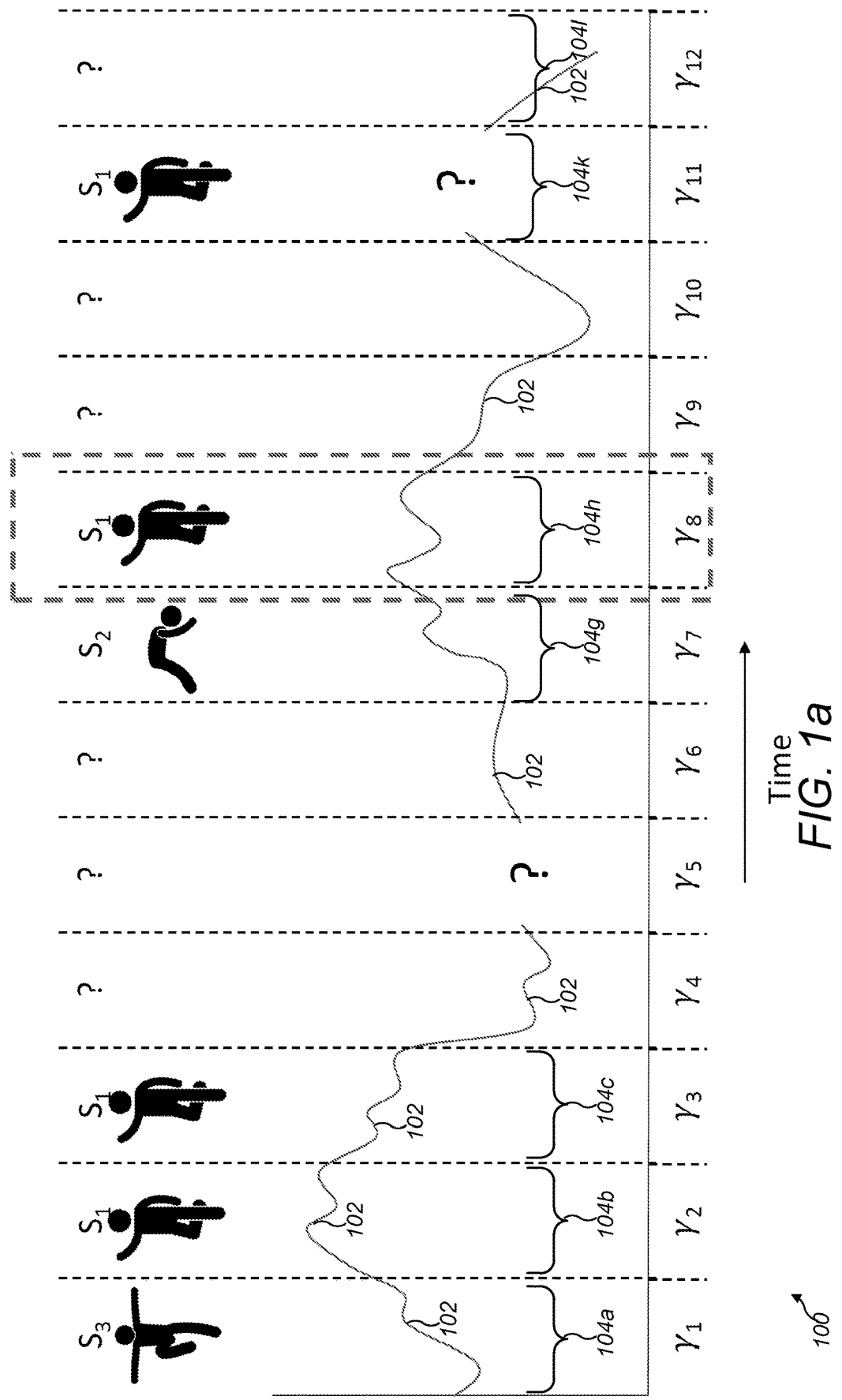
FIG. 1a is a schematic diagram illustrating an example classification of a high frequency time varying input data signal(s)
Figure 1B:
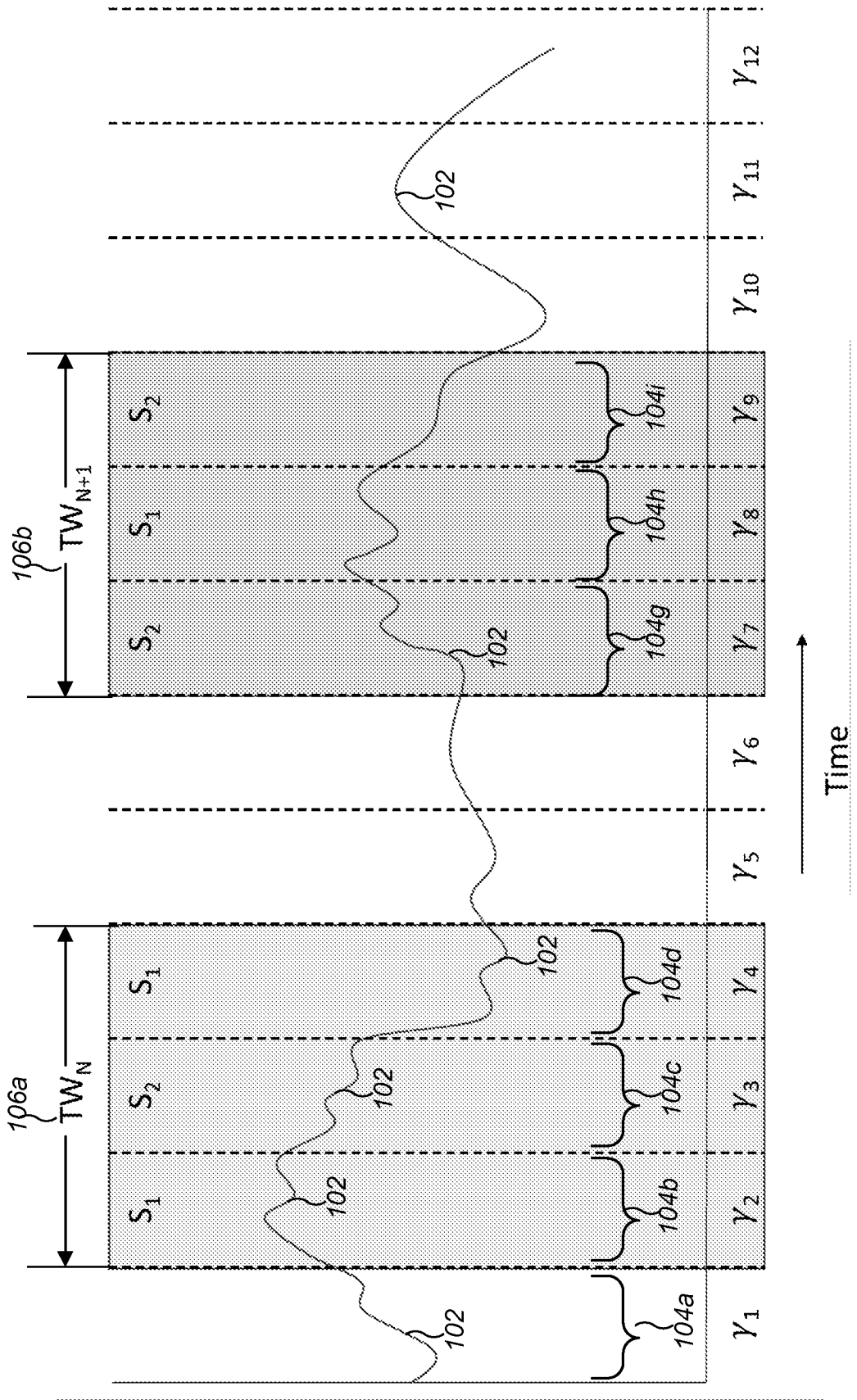
Figure 1C:
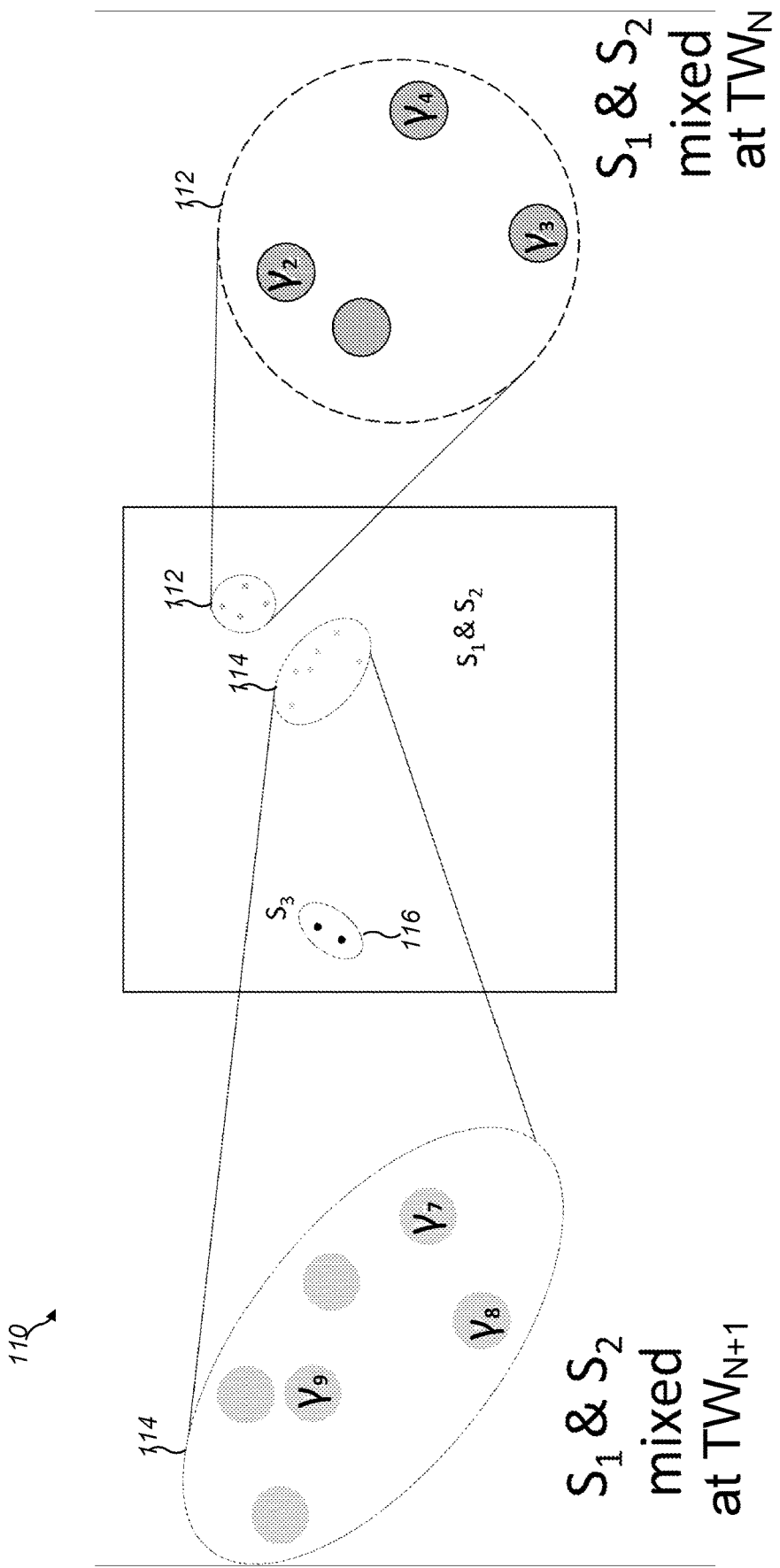
FIG. 1c is a schematic diagram illustrating an example clustering of the vector labels of the high frequency time varying input data signal(s) according to FIGS. 1a and 1b.

Common reference numerals are used throughout the figures to indicate similar features.

DETAILED DESCRIPTION

Embodiments of the present invention are described below by way of example only. These examples represent the best ways of putting the invention into practice that are currently known to the Applicant although they are not the only ways in which this could be achieved. The description sets forth the functions of the example and the sequence of steps for constructing and operating the example. However, the same or equivalent functions and sequences may be accomplished by different examples.

The inventors have advantageously found that machine learning technique(s) for classifying input data may be made more robust by using, judiciously operating on and/or processing latent vector(s) from a latent vector space when classifying input data. The latent vector may include a label vector y and a style vector z, where the label vector y is used for classification of the input data, and where at least a part of the style vector z may be regularised or the style vector z may wholly be regularised causing the machine learning technique to output label vectors y that are substantially time invariant, time invariant, or more time invariant that compared with when the machine learning technique does not regularise the style vector z. This substantially improves the classification accuracy, robustness and performance to high frequency time varying input data of the corresponding machine learning technique(s).

Figure 2A:
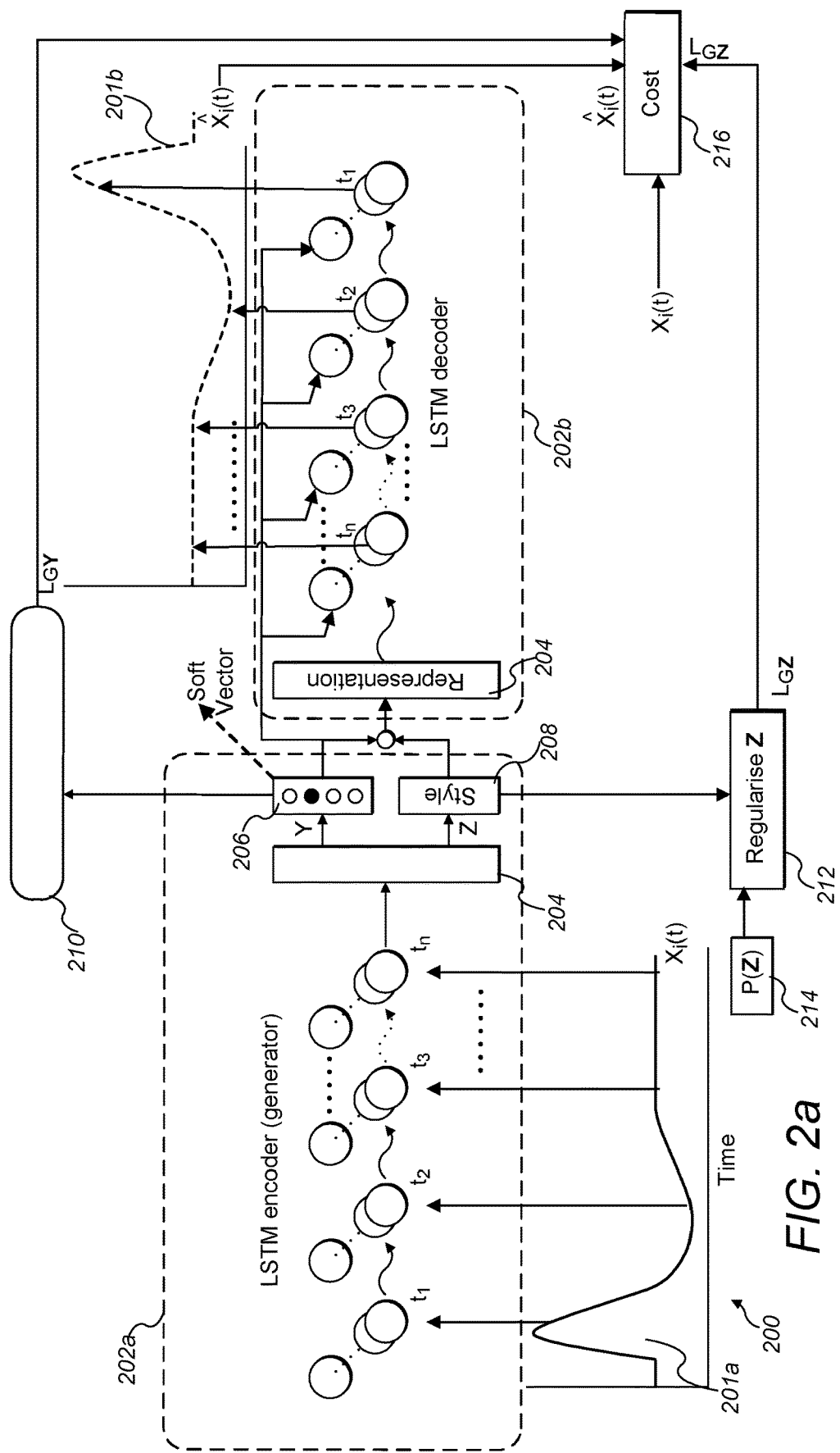
FIG. 2a is a schematic diagram illustrating an example ML technique according to the invention.

FIG. 2a is a schematic diagram illustrating an example ML technique 200 for use in classifying input data samples 201a according to the invention. In this example the ML technique 200 is an autoencoder. The autoencoder 200 includes an encoding network 202a, a decoding network 202b, and a latent space representation layer 204 that outputs a latent vector of an N-dimensional latent space for use in classifying input data samples. The encoding network 202a and decoding network 202b are coupled to the latent space representation layer 204. The encoding network 202a outputs to the latent representation layer 204. The latent representation layer 204 consists of a latent vector that includes a label vector y 206 and a style vector z 208. The decoder network 202b receives the latent vector from the latent representation layer 204 and outputs an estimate of the input data samples 201a in the form of reconstructed input data samples 201b. The autoencoder 200 includes an adversarial network 210 for use in enforcing the label vector y 208 to be more one-hot and label-like. The autoencoder 200 includes a regularisation network or component 212 connected to the style vector z 208 of the latent representation layer 204, the regularisation network 212 is configured for regularising the style vector z during training of the autoencoder and effecting a substantially time invariant output label vector y for when the trained autoencoder classifies input data samples 201a.

Figure 2B:
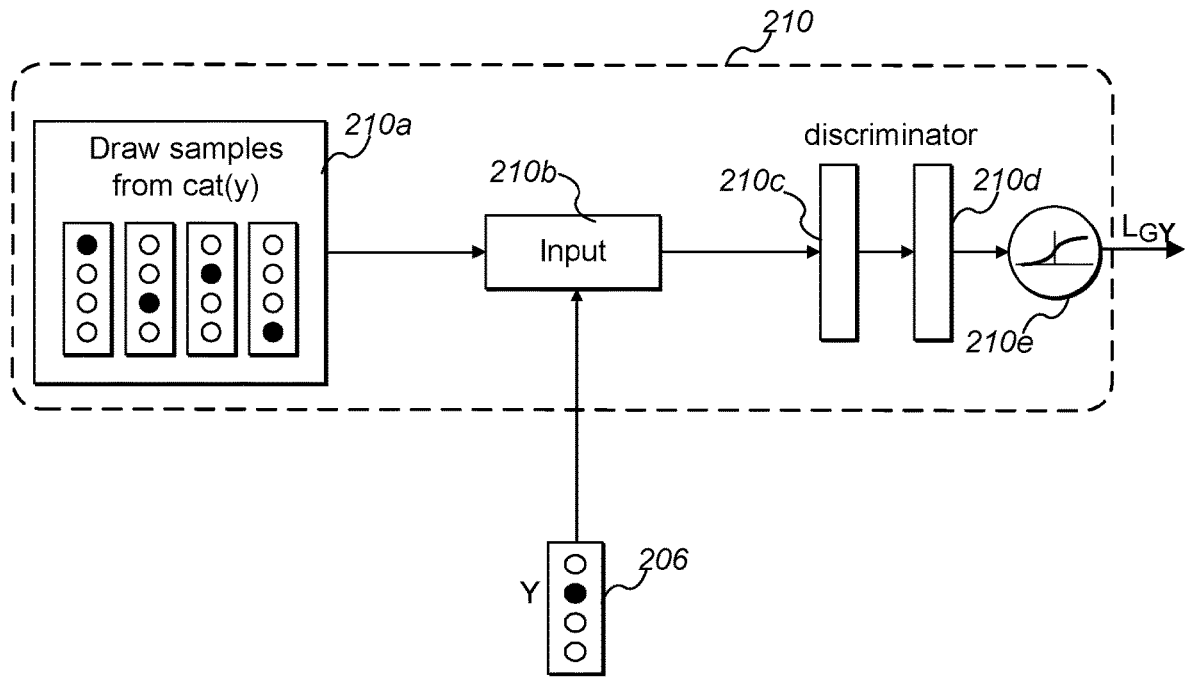
FIG. 2b is a schematic diagram illustrating an example discriminator for use with the ML technique of FIG. 2b according to the invention.

In particular, the adversarial network 210 of the autoencoder, referring to FIG. 2b, may include an input layer 210a, one or more hidden layer(s) 210c and 210d, and an output layer 210e used to evaluate a label vector generator loss function value, $L_{GY}$, associated with label vector y 206. The input layer 210a of the adversarial network 210 is connected to the label vector y 206 and a categorical distribution of a set of one-hot vectors 210a of the same dimension as label vector y 206. The adversarial network 210 may be configured, during training, for training the one or more hidden layer(s) 210c and 210d to distinguish between label vectors y 206 and sample vectors from the categorical distribution of the set of one-hot vectors 210a of the same dimension as the label vector y 206. The label vector generator loss function value $L_{GY}$ is associated with label vector y 206 and is for use in training the encoder network 202a to enforce the categorical distribution of the set of one-hot vectors 210a onto the label vector y 206. The size of the label vector y 206 may be based on the number of classes, categories and/or states that are to be classified from the input data samples 201a.

Figure 2C:
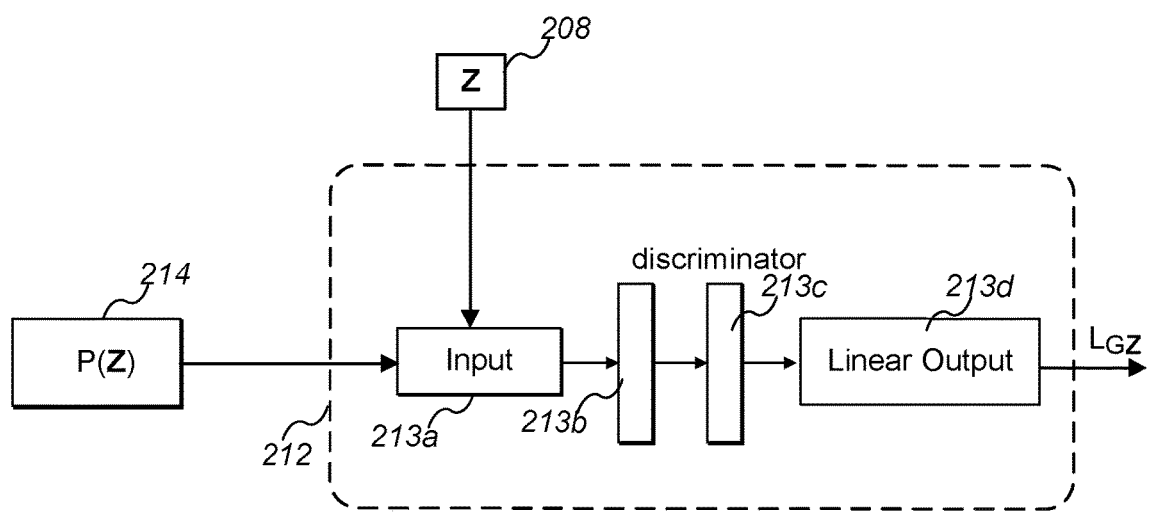
FIG. 2c is a schematic diagram illustrating an example regularisation network for use with the ML technique of FIG. 2b according to the invention.

Furthermore, the regularisation network 212 of the autoencoder 200 is connected to the latent representation layer 204. In particular, the regularisation network 212 is connected to the style vector z 208 and is configured for regularising the style vector z 208 during training of the autoencoder 200 and effecting a substantially time invariant output label vector y 206 when the trained autoencoder 200 classifies input data. The regularisation network 212, referring to FIG. 2c, includes an input layer 213a and a discriminator network including one or more hidden layer(s) 213b and 213c and an output layer 213d for outputting a style vector generator loss function value $L_{GZ}$, where the input layer 213a is connected to the style vector z 208 and a selected probability distribution P(z) 214. The regularisation network 212 is configured, during training of autoencoder 200, for training the discriminator network to distinguish between the corresponding style vector z 208 and a sample vector generated from the corresponding selected probability distribution P(z) 214, where the sample vector is of the same dimension as the style vector z 208. The output style vector generator loss function value, $L_{GZ}$, is used for training the encoder network 202a to enforce the probability distribution P(z) on style vector z of the latent vector.

The probability distribution P(z) 214 may be selected from one or more probability distributions or combinations thereof from the group of: a Laplacian distribution; a Gamma distribution; a Gaussian distribution; and permutations of the aforementioned distributions with different properties such as variance and any other probability distribution that is deemed to improve the time invariance of the label vector(s) y 206 associated with the input data.

The autoencoder 200 may be trained on input data samples 201a using a loss or cost function, represented by 216, based on, by way of example only but is not limited to, the generator loss, a combination of label vector generator loss function value, $L_{GY}$, and the style vector generator loss function value, $L_{GZ}$, in the example of FIG. 2a, a reconstruction loss based on the output 201b from the decoding network 202b and the original input data samples 201a input to the encoder network 202a. The weights of the hidden layer(s) of the encoding network 202a and/or decoding network 202b are updated based on the generated loss of cost function of cost module 216.

An example of a high frequency time varying input data signal may be, by way of example only but is not limited to, a neurological signal associated with neural activity of one or more neuronal populations of a subject. A neural receiver or neural sensor may comprise or represent any apparatus, mechanism or device capable of detecting and measuring the neural activity of one or more neurons of a neuronal population of the subject and outputting a neurological signal $x_i(t)$ or $x_j(t)$ representative of the neural activity. Essentially, neural activity may comprise or represent any electrical, mechanical, chemical and or temporal activity present in the one or more neurons (or the neuronal population), which often make up one or more nerves or section(s) of neural tissue. Neural activity may convey information associated with, by way of example only but not limited to, the body of the subject and/or information about the environment affecting the body of the subject. The information conveyed by neural activity may include data representative of neural data, neural information, neural intent, end effect, tissue state, body state, neural state or state of the body, and/or or any other data, variable or information representative of the information carried or contained in neural activity and interpreted and/or passed by neurons or neuronal populations to the body of the subject. For example, neural data may include any data that is representative of the information or data that is contained or conveyed by neural activity of one or more neurons or a neuronal population. The neural data may include, by way of example only but is not limited to, data representative of estimates of one or more bodily variable(s) associated with the corresponding neural activity, or any other data, variable or information representative of the information carried or contained or conveyed by neural activity.

This information may be represented in an information theoretic point of view as one or more variables associated with the body, which are referred to herein as bodily variable(s). A bodily variable comprises or represents a desired end effect or tissue state that is transmitted to or from the central nervous system (CNS) that may itself be classified as a sensory, control or other variable based on the role or function of this information and the use of it by the body, the CNS or an attached device. One or more instances of neural activity at one or more neural locations can be said to be an encoding of one or more bodily variables. For example, neural activity of one or more neurons of nerve(s) may be generated or modulated by part of the body to encode one or more bodily variables for reception by other parts of the body, which decode the neural activity to gain access to the bodily variable. Both encoding and decoding of bodily variables can be performed by the CNS and/or bodily tissues therefore facilitating transmission of information around the body of a subject.

In another example, in the somatic nervous system (SoNS), one or more bodily variable(s) generated by the CNS may be transmitted via the peripheral nervous system (PNS) as efferent neural activity that is associated with one or more instances of motion (e.g. each bodily variable may be associated with a different motion or movement of a limb). In another example, in the autonomic nervous system (ANS), each instance of a bodily variable may be associated with a modified organ function, modifying an organ function, or modifying a bodily function (e.g. one or more bodily variable(s) may be associated with producing more or less insulin; or may be associated with blood pressure measurements; etc.). The CNS may also receive an afferent neural activity encoding a bodily variable corresponding to sensory neural information (e.g. a sensory bodily variable), where in this case the sensory bodily variable represents an encoding of sensory information about the state of a limb or the state of an organ or tissue generated by one or more neuron(s) or one or more neuronal population(s) associated with the limb, organ or tissue and the like. The CNS receives the afferent neural activity and then deciphers or decodes this neural activity to understand the sensory bodily variable(s) and responds accordingly.

Although several examples of bodily variables have been described, this is for simplicity and by way of example only, it is to be appreciated by the skilled person that the present disclosure is not so limited and that there are a plurality of bodily variables that may be generated by the body of a subject and which may be sent between parts of the body or around the body as neural activity.

An example of the autoencoder 200 may be used for classifying high frequency time varying input data signal(s) such as, by way of example only but is not limited to, multi-channel neurological signals $x_1(t), \ldots, x_i(t), x_j(t), \ldots, x_M(t)$ output from a corresponding plurality of neural receiver(s) or sensor(s) coupled to a subject. The neurological signals $x_1(t), \ldots, x_n(t)$ are processed using one or more ML technique(s) trained for estimating a set of label vector(s) y 206 as an informational rich data representation of bodily variables encoded as neural activity, and classifying the set of label vectors y 206 accordingly. A neurological signal, denoted $x_i(t)$ or $x_j(t)$, may comprise or represent a time domain signal associated with the electrical spatial and temporal activity in a neuronal population as detected and/or measured local to one or more neural receivers or sensors in response to a bodily variable that is generated by the CNS of a subject. The CNS of the subject encodes the bodily variable as neural activity, which is communicated along one or more nerves associated with the neuronal population.

Autoencoder 200 may be configured to receive the multichannel neurological signals $x_1(t), \ldots, x_i(t), x_j(t), \ldots, x_M(t)$ as data representative of the k-th neural activity encoding one or more bodily variable(s) in the form of a k-th neurological sample vector sequence $(x_i)^k$ 201a for $1 \leq i \leq L_k$ and $k \geq 1$, where $x_i$ is the i-th sample vector of the multi-channel neurological signal $x_1(t), \ldots, x_i(t), x_j(t), \ldots, x_M(t)$, which is an M-dimensional vector in which each element of $x_i = [x_1(t_i), \ldots, x_m(t_i), \ldots, x_M(t_i)]^T$ represents a sample from the corresponding m-th channel for $1 \leq m \leq M$ taken at sampling time step i for $1 \leq i \leq L_k$, M is the number of channels and $L_k$ is the length of the sample sequence or number of samples sufficient to capture the k-th neural activity encoding one or more bodily variable(s). Thus, data representative of the k-th neural activity encoding one or more bodily variable(s) may consist of $L_k \times M$ samples.

The decoding network 202b includes latent space representation layer 204 connected to one or more further hidden layers that are connected to a decoding output layer for outputting an estimate of the k-th neurological sample vector sequence $(\hat{x}_i)^k$ 201b $1 \leq i \leq L_k$ and $k \geq 1$, which is a reconstruction of the input k-th neurological sample vector sequence $(x_i)^k$ 201a $1 \leq i \leq L_k$ and $k \geq 1$. For the k-th neurological sample vector sequence $(x_i)^k$ 201a, the latent space representation layer 204 of the encoder network 202a is configured to form a latent vector comprising a label vector $y_k$ 206 and continuous latent variable vector $z_k$ 208. The number of elements of $y_k$ 206 may correspond to the number of unique bodily variable labels that are to be classified. Alternatively, the number of elements of $y_k$ 206 may also correspond to the expected number of bodily variable labels that may be found when using an unlabelled bodily variable training dataset. Alternatively, the number of elements of $y_k$ 206 may correspond to the number of uncorrelated or unique neurological sample vector sequences that are in an unlabelled bodily variable training dataset. The number of elements of $y_k$ may alternatively be determined through trial and error by observing how the number of unique bodily variable vector estimates changes as the autoencoder 200 is trained on the same unlabelled bodily variable training dataset.

The autoencoder 200 may be based on a sequence-to-sequence recurrent neural network model in which the adversarial network 210 is a Wasserstein Generative Adversarial Network (WGAN) 210 for use in inferring the actions of a subject (not shown) from neurological signals received by one or more neural receiver(s) situated to a corresponding one or more neuronal population(s) in part of the nervous system of the subject. For example, the neurological signals may be received by the neural receiver(s) from one or more neuronal populations of, by way of example only but not limited to, an efferent nerve. The WGAN 262 is used to constrain the latent representations of the sequence-to-sequence network 260 to be label-like, which allows classification/labelling of the latent representations in relation to neural activity encoding one or more bodily variables or combinations thereof. For example, the labelling may be achieved by matching portions of the received neurological signal(s) associated with bodily variable(s) with sensor data associated with the subject when the bodily variable was detected; this allows the bodily variable(s) to be identified based on the matched sensor data and bodily variable labels to be assigned to allow labelling of the latent representations that classify the associated neural activity encoding the bodily variable(s).

As previously described, multi-channel neurological signals $x_1(t), \ldots, x_i(t), x_j(t), \ldots, x_M(t)$ may be received from a number of M neural receivers to form multi-channel neurological signal samples $(x_i)$ for $i \geq 1$, where $x_i$ is the i-th sample vector of an M-dimensional vector space of the multi-channel neurological signal in which each element of $x_i$ represents the i-th sample from the corresponding m-th channel for $1 \leq m \leq M$. Each k-th section of the multi-channel neurological signal $x_1(t), \ldots, x_i(t), x_j(t), \ldots, x_M(t)$ that indicates neural activity (e.g. a set of neural impulse(s)) may be sampled and stored as a sample vector sequence $(x_i)^k$ $201a$ for $1 \leq i \leq L_k$ and $k \geq 1$, where $L_k$ is the length of the k-th sample sequence or number of samples taken from the k-th section that captures the k-th neural activity encoding one or more bodily variable(s) or combinations thereof. Data representative of the k-th neural activity encoding one or more bodily variables or combinations thereof may consist of $L_k \times M$ samples. Thus, a set of neurological sample vector sequences may be collected and represented as $\{(x_i)^k\}$.

A training set of neurological sample vector sequences may be generated from the collected set of neurological sample vector sequences $\{(x_i)^k\}$ and represented as $\{(x_i)^k\}_{k=1}^T$, where T is the number of neurological sample vector sequences in the training set. The training set $\{(x_i)^k\}_{k=1}^T$ may be generated from previously recorded or stored multichannel neurological signals that identifies a number of neural activities, in which each identified neural activity encodes one or more bodily variable(s) or combinations thereof. This training set $\{(x_i)^k\}_{k=1}^T$ may be generated from $\{(x_i)^k\}$ by analysing and comparing each of the identified neural activities (e.g. automatically analysed as described previously) with corresponding sensor data (e.g. video, audio, motion tracking, blood, heart rate etc.) recorded/stored/collected at the same time the multichannel neurological signals were recorded/stored/sampled and collected. This comparison may be used to identify the action(s) of the subject and so identify each k-th neural activity $1 \leq k \leq T$, which may be used to classify the label vector y 206 output from the autoencoder 200 in relation to the neural activity.

Alternatively, the training set $\{(x_i)^k\}_{k=1}^T$ may be generated from a collected set of unlabelled neurological sample vector sequences $\{(x_i)^k\}$ using autoencoder 200 as a classifier that outputs, from encoder network 202a, the label vector y 206 (e.g. this may be a soft vector) for each of the input neurological sample vector sequences $\{(x_i)^k\}$ $201a$. This may produce a set of label vectors y which can be mapped to a plurality of true states or classes associated with the bodily variables encoded in the neural activity. For example, the set of label vectors y 206 may be used to determine the bodily variable labels (e.g. true state or classes) by observing whether the set of label vectors y 206 form cluster regions, in which each cluster region may be labelled with a bodily variable label. The bodily variable label for each cluster region may be identified by, firstly, comparing each of the neural activities of $\{(x_i)^k\}$ (e.g. automatically analysed) that generate the label vectors y 206 within the cluster region with corresponding sensor data (e.g. video, audio, motion tracking, blood, heart rate etc.) recorded/stored/collected at the same time the multichannel neurological signal sample vector sequences $\{(x_i)^k\}$ were recorded/stored/sampled and collected. This is used to analyse the neural activity and corresponding sensor data associated with said cluster region and determining a bodily variable label based on the analysed neural activity and corresponding sensor data. Thus a mapping from the cluster region to the bodily variable label or true state/classes may be generated and used for classifying label vectors y in accordance with the bodily variable labels or true states/classes etc. A set of T unique bodily variable labels (e.g. true states/classes) and their associated neurological signal sample vector sequences $\{(x_i)^k\}$ may be generated and stored as a bodily variable training dataset $\{(x_i)^k\}_{k=1}^T$ that has been labelled. This may be used to further train one or more ML technique(s).

Given the collected set of neurological sample vector sequences $\{(x_i)^k\}$ can be very large and contain features too nuanced for manual human analysis, ML techniques such as autoencoder 200 can assist in analysing, learning and labelling representations of the neurological sample vector sequences $\{(x_i)^k\}$ suitable for outputting to one or more device(s) for managing bodily functions of the subject. In this example, the autoencoder 200 is based on a semi-supervised sequence-to-sequence model. The autoencoder 200 is a sequence-to-sequence model that encodes a given neurological sample vector sequence $(x_i)^k$ $201a$ for $1 \leq i \leq L_k$ and $k \geq 1$ into a fixed-size continuous vector representation or latent vector representation. The autoencoder 200 includes an encoder network 202a and decoder network 202b, both of which are, by way of example only but not limited to, long short-term memory (LSTM) recurrent neural networks (RNNs). As described, the autoencoder is augmented with an adversarial discriminator 210 that is trained to distinguish between label vectors y 206 generated by the encoder network 202a and samples (e.g. one-hot vector samples) from a categorical distribution 210a. This augmentation enables the encoder network 202a to be trained to learn an informative label-like latent vector y 206 from unlabelled collected multichannel neurological signal sample vector sequences $\{(x_i)^k\}$ that may be labelled to identify the corresponding neural activity encoding one or more bodily variable(s). The multichannel neurological signal sample vector sequences $\{(x_i)^k\}$ that are received may then be classified based on the bodily variable labels of true states/classes.

The autoencoder 200 also includes a regularising network 212 based on, by way of example only but not limited to, a second WGAN adversarial discriminator network 213b-213d, which is employed to encourage the style vector z 208 representation to be more Gaussian distributed. Although a Gaussian distribution or a normal distribution is described, this is by way of example only and the invention is not so limited, and it is to be appreciated that the skilled person may use, by way of example only but is not limited to, any other probability distribution and the like, or any other probability distribution that further improves the convergence of the networks 202a, 202b, improves the latent space or representation of the latent vector, improves the time invariance of label vector y 206 and/or improves the labelling/classifying and any other aspects of the invention.

The second adversarial discriminator network 213b-213d is trained to distinguish between style vector z 208 of the latent vector generated by the encoder network 202a and samples from a probability distribution P(z), which in this case is the Gaussian distribution N(z|0, I), 214. The style vector z 208 generated by the encoder network 202a and a Gaussian sample are input to hidden layer(s) 213b and 213c of the second adversarial discriminator. The output layer 213d outputs a linear Gaussian result or style vector generator lost function value ($L_{GZ}$) that is used to improve the encoder network's 202a estimate of style vector z 208 to be more Gaussian by rating how close it is to the Gaussian sample/distribution. For example, the cost module 216 may use this Gaussian result or style vector generator lost function value ($L_{GZ}$) to further improve the latent space representation of style vector z 208 is estimated to be closer to a Gaussian distributed vector. The second adversarial neural network is trained in a similar manner as that described for the first adversarial neural network. This improves upon the time invariance of the label vectors y 206 output from the encoder network 202a. Regularizing style vector z 208 reduces the likelihood that the encoder network 202a and the decoder network 202b are trained to over represent the occurrence of a "temporal pattern" within the input neurological sample vector sequences $\{(x_i)^k\}$ $201a$. This results in a reduction and/or minimisation of correlation between adjacent input neurological sample vector sequences $\{(x_i)^k\}$ 201a as the extra constraint on z 208 constrains the flow of information through the latent space more than it did before. Thus y has to be better to allow the same reconstructions and hence an increase in time invariance of the label vectors y 206, or the label vector(s) y 206 being substantially time invariant, that is output from the autoencoder 200 in response to the input neurological sample vector sequences $\{(x_i)^k\}$ 201a. Furthermore, the set of label vector(s) y 206 associated with the same bodily variable label or true state/class label are more likely to be clustered together, and hence a clustering region may be defined that maps to the bodily variable label (or true state/class label). That is, there is a substantial reduction in a scenario in which the autoencoder 200 outputs bodily variable vector labels y 206 that cluster together but which belong to different bodily variable labels or states. Thus, regularising the style vector z 208 enhances the robustness of the resulting classifier, and reduces the sensitivity of the classifier to changes in the input neurological sample vector sequences $\{(x_i)^k\}$ 201a.

In addition, this enables generation of signals for arbitrary categories by selecting a specific y representation, ỹ, sampling z̃ from a Gaussian distribution and using the concatenation of z=z̃ and y=ỹ as the input to the decoder network 202b. Additionally, this allows generation of mixed categories in y. Thus, the encoder network 202a generates two fixed size latent vector representations latent vector z̃ and also label vector ỹ, which is used as the bodily variable estimate and may be labelled accordingly.

Although a Gaussian distributed variables or the Gaussian distribution and/or normal distribution are described, this is by way of example only and the invention is not so limited, and it is to be appreciated that the skilled person may use, by way of example only but is not limited to, any other probability distribution and the like, or any other probability distribution that further improves the convergence of the networks 202a, 202b, improves the latent space or representation of the latent vector, increases the time invariance of label vector(s) y 206 and/or improves the labelling/classifying and any other aspects of the invention.

In this example, the autoencoder 200 makes use of, by way of example only but is not limited to, a single layer LSTM as an encoder network 202a and decoder network 202b. More than one layer may be used in the LSTM, but a single layer LSTM is described for simplicity. The encoder network 202a generates two fixed size latent representations, style vector z 208 and label vector y 206 for an arbitrary length (or as described previously herein) neurological vector sample sequence $x_i=(x_i)^k$ 201a for $1 \le i \le L_k$ and $k \ge 1$, denoted as q(z, y|$x_i$). The decoder network 202b then uses both the style vector z 208 and label vector y 206 representations to reconstruct the original input neurological vector sample sequence $(x_i)^k$ 201a for $1 \le i \le L_k$ and $k \ge 1$. At each time step i or $t_i$ in the decoder network 202b, the y-section of the state memory is replaced by the original y, where the rest of the vector is left to change over time. This places more importance on generating an informative y representation for the decoder network 202b to use at each time step. Alternating the input to the decoder network 202b at each training iteration between the true input $x_i=(x_i)^k$ or the output from the previous time step in the LSTM stabilised the training and made the autoencoder 200 more robust. In addition, reversing the output when decoding made training easier and faster by allowing the autoencoder 200 to start off with low-range correlations.

Alternatively, the k-th sequence of $L_k$ multichannel neurological sample vectors $(x_i)^k$ 201a $1 \le i \le L_k$ may be grouped into $N<L_k$ data points or subgroups/subsequences of multichannel neurological sample vectors for $1 \le n \le N$, where $L_k/N$ is an integer and each data point or subgroup, may be denoted $X_n$ 201a as an N×M matrix of N multichannel neurological sample vectors (e.g. each multichannel neurological sample vector is an M-dimensional vector) made up from N multichannel neurological sample vectors contiguously selected from the k-th set or k-th sequence of $L_k$ multichannel neurological sample vectors $(x_i)^k$, $1 \le i \le L_k$. Thus, there may be a total of N time steps for $1 \le n \le N$ that may be used to encode each k-th sequence of $L_k$ multichannel neurological sample vectors $(x_i)^k$ $1 \le i \le L_k$; and N time steps for $1 \le n \le N$ that may be used to decode or reconstruct the input k-th sequence of $L_k$ multichannel neurological sample vectors $(x_i)^k$ $1 \le i \le L_k$. At each time step n or $t_n$ for $1 \le n \le N$, a data point or subgroup $X_n$ of multichannel neurological sample vectors is input to the encoder network 202a for use in generating, by time step N, the two fixed size latent representations, style vector z 208 and label vector y 206 of an arbitrary length neurological vector sample sequence $x_i=(x_i)^k$ for $1 \le i \le L_k$ and may be denoted as q(z, y|$x_i$). Thus, after N time steps the encoder network 202a has generated the two fixed size latent representations, style vector z 208 and label vector y 206. In the decoder network 202b, the reverse essentially occurs where the y-section of the state memory is replaced by the original y, where the rest of the vector is left to change over time. This places more importance on generating an informative y representation for the decoder network 202b to use at each time step n. Alternating the input to the decoder network 202b at each training iteration between the true input $x=(x_i)^k$ or the output from the previous time step in the LSTM stabilised the training and made the autoencoder 200 more robust. In addition, reversing the output when decoding made training easier and faster by allowing the autoencoder 200 to start off with low-range correlations.

In order to ensure that the label vector y 206 representation is label-like, the discriminator network 210 is used as an additional loss term in the cost function. The adversarial component 210 of the autoencoder allows clustering of data in an unsupervised fashion. The discriminator network 210 follows a generative adversarial network approach in which the generator is the encoder recurrent neural network 202a and the discriminator network 210 learns to distinguish between samples from a categorical distribution 210a (e.g. random one-hot vectors) and the label vector y 206 representation generated by the encoder network 202a. This encourages the label vector y 206 representation to converge towards a degenerate distribution from which actions associated with the input neurological vector sample sequence $(x_i)^k$ can be inferred, whilst keeping the distribution over a continuous space. To prevent mode collapse in y and to stabilize training the discriminator network 210 was based on the Wasserstein generative adversarial network in which batch normalization and minibatch discrimination were used.

In this example, the first hidden layer 210c of the discriminator network 210 may be configured to have a larger number of hidden units (e.g. 50 units) than the second hidden layer 210d (e.g. 20 units). This was followed by minibatch discrimination before being linearly transformed into a scalar value as the label vector generative loss function value $L_{GY}$ and input to the cost function module 216 associated with training the encoder network 202a and decoder network 202b. Batch normalization may be applied to the input and the first activated hidden layers of the discriminator.

The autoencoder 200 may be trained in three separate stages. First the autoencoder 200 comprising the encoder network 202a and the decoder network 202b is trained against the reconstruction error. For example, for $N<L_k$ in which $L_k/N$ is an integer and each data point or subgroup, may be denoted $X_n$ as an N×M matrix of N multichannel neurological sample vectors (e.g. each multichannel neurological sample vector is an M-dimensional vector) made up from N multichannel neurological sample vectors contiguously selected from the k-th set or k-th sequence of $L_k$ multichannel neurological sample vectors $(x_i)^k$, $1 \le i \le L_k$ samples the data points for the k-th multi-channel neurological sample vector sequence may be represented as $(X_n)^k$ in which the N×M samples of $X_n$ is denoted as the input at the n-th time step and the reconstructed input is denoted as $\hat{X}_n$ at the n-th time step. For simplicity and by way of example only, the input at the n-th time step is denoted $x_n$ and the reconstructed input is denoted $\hat{x}_n$ at the n-th time step in which the loss cost function of the autoencoder 200, $L_{AE}$, may be defined as:

$$L_{AE} = -\frac{1}{N}\sum_n^N (x_n - \hat{x}_n)^2$$

In the second stage, the discriminator function f learns the distinguish between label vectors y 206 generated from the generator function $g(x_n)$ and categorical samples y' by means of the following loss function $L_{DY}$:

$$L_{DY} = -\frac{1}{N}\sum_n^N (-f(y'_n) + f(g(x_n)))$$

where each $y'_n$ is sampled at random from a categorical distribution 210a. Effectively, the discriminator network 210 is trained to produce negative values when the input is generated and positive values when the input is sampled from a categorical distribution 210a.

In the third stage, the encoder network 202a (e.g. generator) is trained to generate a label vector y 206 representation that is one-hot-like by 'fooling' the discriminator network 210. The following loss function, $L_{GY}$, encourages or trains/adapts the encoder network 202a to generate a label vector y 206 such that the now fixed discriminator function f yields positive values, $$L_{GY} = -\frac{1}{N}\sum_n^N f(g(x_n))$$

The discriminator network 210 may be updated several times (e.g. 3 times) for every update of the encoder network 202a (e.g. the generator). This ensures that the discriminator network 210 directs or points the encoder network 202a (e.g. the generator) in the correct direction at each of the encoder network's 202a update steps.

In particular, in the second stage, the additional discriminator function f also learns the difference between style vectors z 208 generated from the generator function $g(x_n)$ and samples z' from a Gaussian distribution 214 by means of the following loss function $L_{DZ}$:

$$L_{DZ} = -\frac{1}{N}\sum_n^N (-f(z'_n) + f(g(x_n)))$$

where each $z'_n$ is sampled at random from a Gaussian distribution 214. Effectively, the discriminator network 210 is trained to produce negative values when the input is generated and positive values when the input is sampled from a categorical distribution 210a.

In the third stage, the encoder network 202a (e.g. generator) is trained to generate a style vector z 208 representation that is Gaussian-like by 'fooling' the discriminator network 212. The following loss function, $L_{GZ}$, encourages or trains/adapts the encoder network 202a to generate a style vector z 208 such that the now fixed discriminator function f( ) yields positive values, $$L_{GZ} = -\frac{1}{N}\sum_n^N f(g(x_n))$$

The discriminator network 212 may be updated several times (e.g. 3 times) for every update of the encoder network 202a (e.g. the generator). This ensures that the discriminator network 212 directs or points the encoder network 202a (e.g. the generator) in the correct direction at each of the encoder network's 202a update steps.

The regularisation network 212 discriminator and generator training updates for the z representation are the same as those detailed above for label vector y, with the exception of replacing the categorical y with samples z from a Gaussian distribution 214. All the networks of the model are updated at the same frequency during training.

As an example trial of the autoencoder 200, 4 hours of a 15 channel neurological signal sample data (e.g. M=15) was collected from the left front leg of a subject. The neurological signal sample data was sampled at, by way of example only but not limited to, 30 kHz and spikes representing neural activity encoding bodily variable(s) in the neurological signal sample data were detected using a voltage threshold of, by way of example only but not limited to, 26 mV. It is to be appreciated by the skilled person that other voltage threshold levels may be used depending on the sensitivity required. Two datasets were used in order to determine how well the autoencoder 200 performed. The first dataset consisted of the raw neurological signals from all of the 15 channels for, by way of example only but not limited to, 50 time steps after a spike (e.g. neural activity) was detected on any of the channels. In this case, a total of 250,911 spikes of neural activity were detected in the recorded period. The second dataset consisted of the number of spikes on each channel within, by way of example only but not limited to, a 0.01 s bin. Both sets are normalised to range from 0 to 1 and are then sliced into segments of 50 consecutive counts resulting in a total of 6,840 data points. This variation of the data reduces some of the noise present in the raw data, and takes into account for the longer periods that actions of the subject may take to execute. In this example, for both datasets, a single data point has 50 time steps and 15 variables.

Sensor data was also collected whilst the 15 channel neurological signal sample data was collected. In this trial, the sensor data was video footage of the subject that was collected for a period of 24 minutes. The video footage of the subject was analysed and 5 distinct actions performed by the subject were identified, hence 5 distinct neural activities, each of which represented an encoding of a different set of one or more bodily variable(s) or combinations thereof. These actions were: walking forwards, standing, shuffling, reversing, and turning. When the video footage was synchronized to the recorded neurological signal sample data, and neurological signal sample vector sequences or segments of the time series were labelled according to the identified actions with a granularity of 0.1 s. Of the total number of data points in the raw spike data and the count data, 3003 and 74 were labelled respectively. These labelled data points allowed the determination of how good the generated label vector y 206 representations are by using the accuracy in classifying these data points as a proxy. The labelled data were removed from the datasets and not used during training.

In order to establish whether the autoencoder 200 operated as expected, it was evaluated on 2 other datasets. The first is a synthetic dataset with 4 classes (sinus-, cosine-, saw-tooth-, and square-waves). Here 1,000,000 samples were generated with unit amplitudes and random periods between 4 and 30 time steps. All the waveforms had a length of 50 time steps. 200,000 data points were held out for testing. The second dataset was a low-resolution versions of images from the Modified National Institute of Standards and Technology database (MNIST). In this case, the MNIST images were resized from a size of 28×28 pixels to 7×7. The images were processed in scanline order and the shorter sequences made learning easier for the model.

For each dataset a validation set was constructed by randomly splitting the training data with a 80:20 (training: validation) ratio. The best model was selected based on the lowest reconstruction error achieved over the course of training. To prevent overfitting on the smaller count and synthetic datasets, the size of the label vector y 206 was set to 20 and the size of style vector z 208 was set to 44. For the raw spike and MNIST data, the size of the label vector y 206 was set to 30 and the size of style vector z 208 was set to 98. Larger y-representations were chosen and resulted in more accurate classifications.

In order to establish the classification accuracy that the autoencoder 200 achieves for each dataset, the following evaluation protocol was applied: For each dimension i in label vector y 206 the probabilities of the set of data points in x that have maximum probabilities in this dimension $q(y_i|x)$ were found. The true class labels are then weighted by these probabilities and the class with the maximum average over the selected set of samples is assigned to $y_i$ by means of a hashmap. The accuracy is then computed based on the labels assigned to each data point.

The classification accuracies obtained for the 4 datasets are shown in Table 1 below.

TABLE 1

Experiment Accuracies

| Dataset | Accuracy | Reconstruction squared error |
|---|---|---|
| Synthetic | 0.90 | 0.00131593 |
| MNIST | 0.781 | 111.1957773 |
| Neural-raw | 0.64 | 0.0015137 |
| Neural-count | 0.833 | 4.231e−5 |

The accuracies reported are the averages over 10 independent runs. The squared loss achieved on the test sets were calculated to show the efficacy of the data reconstruction achieved by the autoencoder 200. High accuracies were achieved for both the synthetic and MNIST datasets, which confirms that the autoencoder 200 operates as expected. For the MNIST data, the accuracies were lower than usual because a low resolution version of the MNIST images were used, which makes some digits hard to distinguish. A higher classification accuracy was achieved on the count dataset compared to the raw spike dataset. This is most likely due to the count dataset observing actions over longer periods, which provides more informative information and possibly noise robustness. The autoencoder 200 has shown that having a continuous vector space of label vector y 206 to represent the actions of the subject provides a substantial benefit from a modelling perspective compared to discrete approaches. In addition, the continuous vector space of label vector y 206 representing estimates of bodily variable(s) or combinations thereof is a data friendly representation that may be used by one or more device(s) for managing or operating bodily functions or one or more body parts of a subject.

Modifications to the autoencoder 200 may include stitching together datasets collected from different subjects in order to make a large part of the autoencoder 200 agnostic to the specific subject. The autoencoder 200 may be further modified to be based on convolutional neural networks instead of LSTMs and/or based on a WaveNet generative model. The WaveNet generative model includes a fully convolutional neural network, where the convolutional layers have various dilation factors that allow its receptive field to grow exponentially with depth and cover thousands of time steps, which may improve analysis of neurological time series.

Figure 2D:
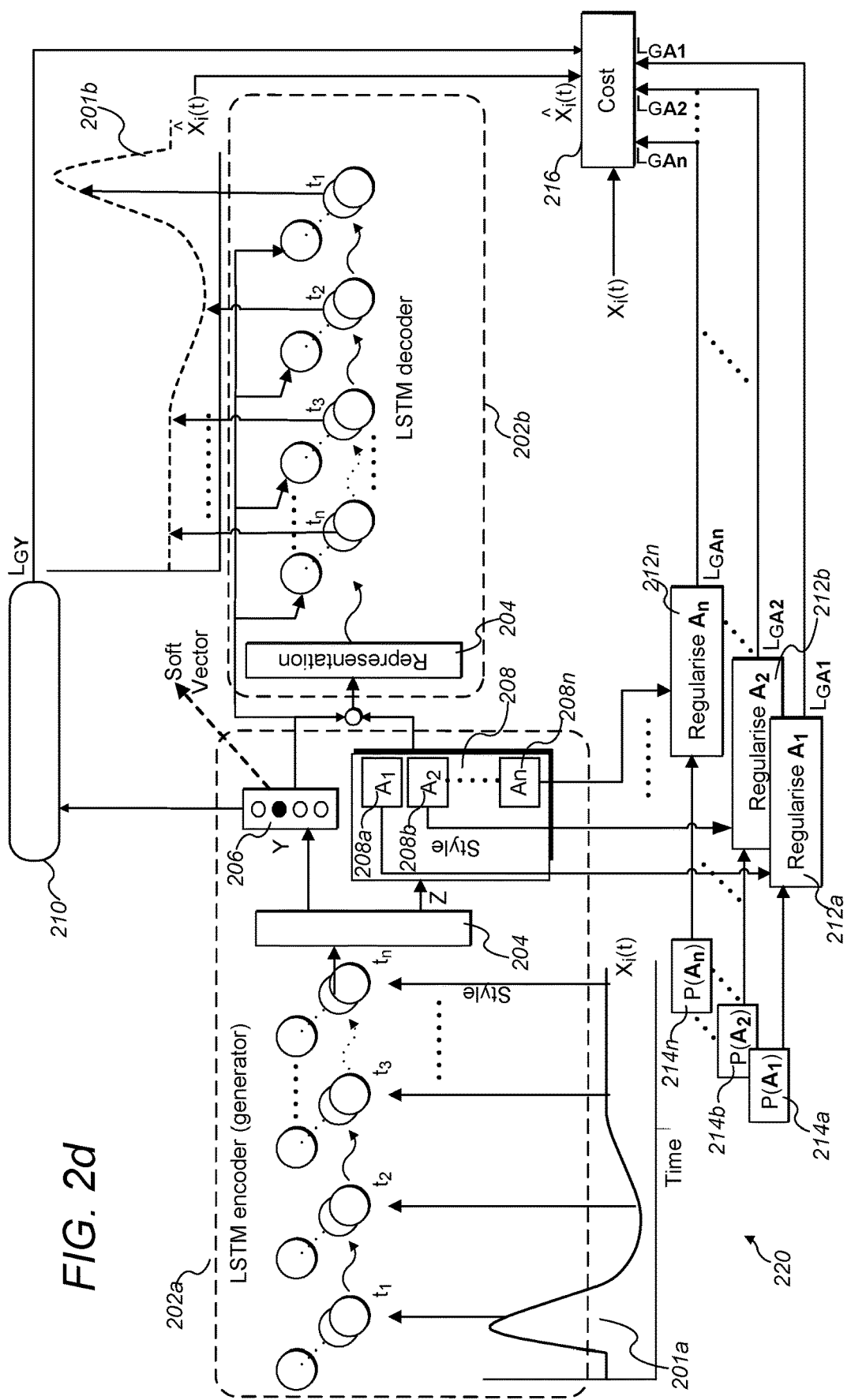
FIG. 2d is a schematic diagram illustrating another example ML technique according to the invention.

FIG. 2d is a schematic diagram illustrating another example ML technique 220 for use in classifying input data samples 201a according to the invention. In this example, the ML technique 220 modifies the autoencoder 200 of FIGS. 2a to 2c by including one or more or a multiple of regularisation networks 212a-212n. The autoencoder 220 includes an encoding network 202a, a decoding network 202b, and a latent space representation layer 204 that outputs a latent vector of an N-dimensional latent space for use in classifying input data samples. The encoding network 202a and decoding network 202b are coupled to the latent space representation layer 204. The encoding network 202a outputs to the latent representation layer 204. The latent representation layer 204 outputs a latent vector that includes a label vector y 206 and a style vector z 208.

The autoencoder 220 is further modified by partitioning the style vector z 208 into a number of one or more vector(s) $A_i$ 208a-208n or a multiple number of vector(s) $A_i$ 208a-208n. It is noted that when there is only one vector $A_i$ 208a, then vector $A_i$ 208a is the style vector z 208, which is the case as described with respect to FIG. 2a. However, when there are more than one vectors $A_i$ 208a-208n then style vector z 208 is divided up into separate vectors $A_i$ 208a-

208n. The vectors $A_i$ 208a-208n are concatenated to form style vector z 208. Regularisation of the style vector z 208 is then performed on each of the vectors $A_i$ 208a-208n based on a corresponding selected one or more probability distribution(s) $P(A_i)$ 214a-214n. Thus each vector $A_i$ 208a is individually regularised to enforce the corresponding selected probability distribution $P(A_i)$ 214a on the said each vector $A_i$ 208a of the style vector z 208.

The decoder network 202b receives the latent vector from the latent representation layer 204 and outputs an estimate of the input data samples 201a in the form of reconstructed input data samples 201b. The autoencoder 220 includes an adversarial network 210 for use in enforcing the label vector y 208 to be one-hot or label-like. The autoencoder 220 includes a regularisation network or component 212 connected to the style vector z 208 of the latent representation layer 204, the regularisation network 212 is configured for regularising the style vector z during training of the autoencoder and effecting a substantially time invariant output label vector y for when the trained autoencoder classifies input data samples 201a.

In particular, the adversarial network 210 of the autoencoder, referring to FIG. 2b, may include an input layer 210a, one or more hidden layer(s) 210c and 210d, and an output layer 210e for evaluating a label vector generator loss function value, $L_{GY}$, associated with label vector y 206. The input layer 210a of the adversarial network 210 is connected to the label vector y 206 and a categorical distribution of a set of one-hot vectors 210a of the same dimension as label vector y 206. The adversarial network 210 may be configured, during training, for training the one or more hidden layer(s) 210c and 210d to distinguish between label vectors y 206 and sample vectors from the categorical distribution of the set of one-hot vectors 210a of the same dimension as the label vector y 206. The label vector generator loss function value $L_{GY}$ is associated with label vector y 206 and is for use in training the encoder network 202a to enforce the categorical distribution of the set of one-hot vectors 210a onto the label vector y 206. The size of the label vector y 206 may be based on the number of classes, categories and/or states that are to be classified from the input data samples 201a.

Figure 2E:
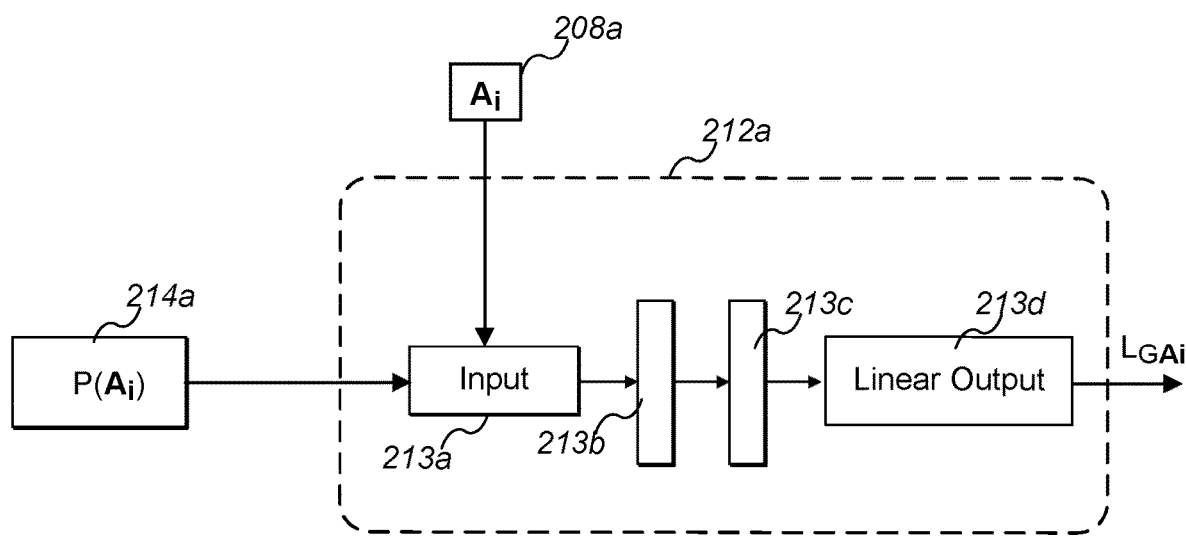
FIG. 2e is a schematic diagram illustrating another example regularisation network for use with the ML technique of FIG. 2b according to the invention.

Furthermore, one or more regularisation network(s) 212a-212n of the autoencoder 220 are connected to a corresponding one or more vector(s) $A_i$ 208a-208n of the latent representation layer 204. In particular, each regularisation network 212a is connected to the corresponding selected vector $A_i$ 208a of the style vector z 208 and is configured for regularising only that vector $A_i$ 208a of the style vector z 208 during training of the autoencoder 220. Thus a plurality of vectors $A_i$ 208a-208n may be regularised individually. This effects a substantially time invariant output label vector y 206 when the trained autoencoder 220 classifies input data. Each of the regularisation network(s) 212a-212n, referring to FIG. 2e, includes an input layer 213a and a discriminator network including one or more hidden layer(s) 213b and 213c and an output layer 213d for evaluating a style vector generator loss function value $L_{GAi}$, where the input layer 213a is connected to a corresponding one of the vectors $A_i$ 208a-208n of the style vector z 208 and a corresponding one of the selected probability distribution(s) $P(A_i)$ 214a-214n.

Each regularisation network 212a is configured, during training of autoencoder 220, for training the discriminator network to distinguish between the corresponding vector $A_i$ 208a of style vector z 208 and a sample vector generated from the corresponding selected probability distribution $P(A_i)$ 214a, where the sample vector is of the same dimension as the corresponding vector $A_i$ 208a of style vector z 208. Thus, a plurality of output style vector generator loss function values, $L_{GA1}, L_{GA2}, \ldots, L_{GAi}, \ldots, L_{GAn}$ corresponding to vectors $A_i$ 208a-208n are used for training the encoder network 202a to enforce each of the selected probability distribution(s) $P(A_i)$ 214a-214n on the corresponding vectors $A_i$ 208a-208n of style vector z 208 of the latent vector.

The regularisation network(s) 212a-212n are used for regularising each of the vectors $A_i$ 208a-208n of the style vector z during training for effecting time invariance in the set of label vectors y associated with the input data. In this case, regularising the style vector z 208 is based on a selected one or more probability distribution(s) $P(A_i)$ 214a-214n and corresponding one or more vector(s) $A_i$ 208a-208n, where the style vector z 208 includes the one or more vector(s) $A_i$ 208a-208n. Regularising the style vector z 208 further includes training the encoder network 202a of the autoencoder 220 with input training data or input data samples 201a to enforce each selected probability distribution $P(A_i)$ 214a-214n on the corresponding portion of the style vector z 208. Regularising the style vector z 208 increases the time invariance of the set of label vectors y during training.

Prior to training the autoencoder 220, the number of one or more vector(s) $A_i$ 208a-208n that may partition the style vector z 208 is selected or specified. As well, the vector size(s) for each of the one or more vector(s) $A_i$ 208a-208n are also selected or specified. If the vector size(s) for each of the one or more vector(s) $A_i$ 208a-208n are not selected, then it may be assumed that the style vector z 208 is partitioned evenly over the selected number of one or more vector(s) $A_i$ 208a-208n. The number of vector(s) $A_i$ 208a-208n that are selected to partition style vector z 208 may be selected to increase or at least improve the time invariance of the label vector y 206 compared to when regularisation is not performed on style vector z 208 or each of the vector(s) $A_i$ 208a-208n partitioning z 208.

Furthermore, a number of one or more probability distribution(s) $P(A_i)$ 214a-214n that correspond to the selected number of vector(s) $A_i$ 208a-208n are also selected. Regularising the style vector z 208 is based on the selected vector(s) $A_i$ 208a-208n and selected probability distribution(s) $P(A_i)$ 214a-214n, where the style vector z 208 is partitioned into the selected vector(s) $A_i$ 208a-208n. Regularising the style vector z 208 based on the selected vector(s) $A_i$ 208a-208n and selected probability distribution(s) $P(A_i)$ 214a-214n may further include regularising each of the selected vector(s) $A_i$ 208a-208n based on the corresponding selected probability distribution $P(A_i)$ 214a-214n.

Each of the selected one or more probability distribution(s) $P(A_i)$ 214a-214n corresponding to the one or more vectors $A_i$ 208a-208n may be different. Alternatively, the selected one or more probability distributions $P(A_i)$ 214a-214n may be the same. Alternatively, the selected probability distributions $P(A_i)$ 214a-214n and corresponding vectors $A_i$ are partitioned into one or more groups of selected probability distributions 214a-214n and corresponding vectors $A_i$, wherein the selected probability distribution(s) $P(A_i)$ 214a-214n within each group are the same. The selected probability distribution(s) $(A_i)$ 214a-214n are selected from one or more probability distributions that increase or at least improve the time variance of the label vector y 206.

The one or more probability distributions $P(A_i)$ 214a-214n may be selected from one or more probability distributions or combinations thereof from the group of: a Laplacian distribution; a Gamma distribution; a Gaussian distribution; and permutations of the aforementioned distributions with different properties such as variance; and any other probability distribution that is deemed to improve the time invariance of the label vector(s) y 206 associated with the input data; compared with the label vector(s) y 206 associated with input data when regularisation is not performed on style vector z 208.

The autoencoder 220 may be trained on input data samples 201a using a loss or cost function, represented by 216, based on, by way of example only but not limited to, a label vector generator loss function value, $L_{GY}$, one or more of the style vector generator loss function value(s) $L_{GA1}, L_{GA2}, \ldots, L_{GAi}, \ldots, L_{GAn}$, a reconstruction estimate of the input data samples output 201b from the decoding network 202b, and the original input data samples 201a input to the encoder network 202a. The weights of the hidden layer(s) of the encoding network 202a and/or decoding network 202b are updated based on the generated loss of cost function of cost module 216.

The autoencoder 220 may also be trained in three separate stages. First the autoencoder 220 comprising the encoder network 202a and the decoder network 202b is trained against the reconstruction error. For example, for $N < L_k$ in which $L_k/N$ is an integer and each data point or subgroup, may be denoted $X_n$ as an N×M matrix of N multichannel neurological sample vectors (e.g. each multichannel neurological sample vector is an M-dimensional vector) made up from N multichannel neurological sample vectors contiguously selected from the k-th set or k-th sequence of $L_k$ multichannel neurological sample vectors $(x_i)^k$, $1 \le i \le L_k$ samples the data points for the k-th multi-channel neurological sample vector sequence may be represented as $(X_n)^k$ in which the N×M samples of $X_n$ is denoted as the input at the n-th time step and the reconstructed input is denoted as $\hat{X}_n$ at the n-th time step. For simplicity and by way of example only, the input at the n-th time step is denoted $x_n$ and the reconstructed input is denoted $\hat{x}_n$ at the n-th time step in which the loss cost function of the autoencoder 220, $L_{AE}$, may be defined as:

$$L_{AE} = -\frac{1}{N}\sum_n^N (x_n - \hat{x}_n)^2$$

In the second stage, the discriminator function f( ) learns the difference between label vectors y 206 generated from the generator function $g(x_n)$ and categorical samples y' by means of the following loss function $L_{DY}$:

$$L_{DY} = -\frac{1}{N}\sum_n^N (-f(y'_n) + f(g(x_n)))$$

where each $y'_n$ is sampled at random from a categorical distribution 210a. Effectively, the discriminator network 210 is trained to produce negative values when the input is generated and positive values when the input is sampled from a categorical distribution 210a.

In the third stage, the encoder network 202a (e.g. generator) is trained to generate a label vector y 206 representation that is one-hot-like by 'fooling' the discriminator network 210. The following loss function, $L_{GY}$, encourages or trains/adapts the encoder network 202a to generate a label vector y 206 such that the now fixed discriminator function f yields positive values, $$L_{GY} = -\frac{1}{N}\sum_n^N f(g(x_n))$$

The discriminator network 210 may be updated several times (e.g. 3 times) for every update of the encoder network 202a (e.g. the generator). This ensures that the discriminator network 210 directs or points the encoder network 202a (e.g. the generator) in the correct direction at each of the encoder network's 202a update steps.

In particular, in the second stage, there are one or more discriminator functions f( ) corresponding to the one or more selected vector(s) $A_i$ 208a-208n of the style vector z 208. Each of the discriminator functions f( ) learns the difference between a corresponding selected vector $A_i$ 208a of the style vector z 208 generated from the generator function $g(x_n)$ and samples Ai' from a corresponding probability distribution 214a by means of the following loss function $L_{DAi}$:

$$L_{DAi} = -\frac{1}{N}\sum_n^N (-f(A'_n) + f(g(x_n)))$$

where each Ai'$_n$ is sampled at random from the probability distribution $P(A_i)$ 214a. Effectively, the discriminator network 212a is trained to produce negative values when the input is generated and positive values when the input is sampled from the probability distribution $P(A_i)$ 214a. This is performed for each of the one or more vectors $A_i$ 208a-208n.

In the third stage, the encoder network 202a (e.g. generator) is trained to generate a representation of each of the one or more vectors $A_i$ 208a-208n of style vector z 208 that approximates or converges to the corresponding probability distribution $P(A_i)$ 214a by 'fooling' the discriminator network 213a-213e. The following loss function values, $L_{GA1}, L_{GA2}, \ldots, L_{GAi}, \ldots, L_{GAn}$ corresponding to vectors $A_i$ 208a-208n are used for training the encoder network 202a to enforce each of the selected probability distribution(s) $P(A_i)$ 214a-214n on the corresponding vectors $A_i$ 208a-208n of style vector z 208 of the latent vector. Thus, these loss function values, $L_{GA1}, L_{GA2}, \ldots, L_{GAi}, \ldots, L_{GAn}$ encourage or train/adapt the encoder network 202a to generate the one or more vectors $A_i$ 208a-208n of style vector z 208 such that the now fixed discriminator function f( ) yields positive values, in which each loss function value $L_{GAi}$ is $$L_{GAi} = -\frac{1}{N}\sum_n^N f(g(x_n))$$

Each of the discriminator networks 212a-212n may be updated several times (e.g. 3 times) for every update of the encoder network 202a (e.g. the generator). This ensures that the discriminator networks 212a-212n directs or points the encoder network 202a (e.g. the generator) in the correct direction at each of the encoder network's 202a update steps.

The regularisation network(s) 212a-212n discriminator(s) and generator(s) training updates for the z representation are the same as those detailed above for label vector y, with the exception of replacing the categorical y with samples z from a Gaussian distribution 214. All the networks of the model are updated at the same frequency during training.

Although FIGS. 2a to 2e describe autoencoders 200 and 220 having an adversarial network 210, this is by way of example only and the autoencoders 200 and 220 are not so limited, it is to be appreciated by the skilled person that an autoencoder that regularises z in order to may the label vector y more time invariant may not require label vector y to be constrained, forced to conform to a categorical distribution, or restricted by an adversarial network 210, instead one or more or any other classification technique(s) may be applicable to be used in place of the adversarial network 210. Thus, adversarial network 210 could be replaced by one or more other classification technique(s) and/or modified based on one or more other classification technique(s) whilst still regularising style vector z such that label vector y is substantially time invariant or time invariant compared with when style vector z is not regularised.

Further modifications may be made to the autoencoder 200 or 220 by removing the adversarial network 210 and replacing with any suitable classification technique for operating on the label vector y. It is to be appreciated that the advantages of regularizing style vector z do not require label vector y to be a one-hot like vector. For example, a modified autoencoder 200 or 220 may be configured by removing the adversarial network 210 such that the label vector y is not constrained or restricted by an adversarial network, and where the autoencoder may further include the latent representation layer outputting the label vector y of the latent space, in which an classification component or technique coupled to the label vector y operates on and/or classifies the label vector y. In cases where the label vector y is not being restricted to a one-hot label like vector, the label vector y may be, by way of example only but is not limited to, a soft vector, any other representation that is not a one-hot like vector, any other representation that is a one-hot like vector but not generated based on an adversarial network 210, or in which the label vector y is a dense soft vector, or any other data representation of label vector y suitable for an appropriate classification technique.

Although FIGS. 2a to 2e describe the style vector z is regularised or that the one or more selected vector(s) Ai are regularised, this is by way of example only and the autoencoder 200 or 220 is not limited, but it is to be appreciated by the skilled person that regularising the style vector z may further include, by way of example only but not limited to, regularising a portion of the style vector z, regularising a section of the style vector z, regularising a subvector of the style vector z, in which the subvector of the style vector z is a subgroup of the selected vectors Ai and/or the length of the subvector of the style vector z is less than the length of the style vector z. Alternatively or additionally, regularising the style vector z may further include selecting a subgroup of the selected vector(s) $A_i$ and corresponding selected probability distributions $P(A_i)$, and regularising only the subgroup of the selected vector(s) $A_i$ of the style vector z, where the number of vector(s) $A_i$ in the subgroup of vector(s) $A_i$ is less than the selected number of vector(s) $A_i$. Alternatively, the style vector z may be partially regularised or the style vector z may be wholly regularised.

The autoencoder(s) 200 and 220 of FIGS. 2a-2e may be optimised by controlling the regularization of style vector z to increase or decrease the time invariance of the label vectors y. The regularisation of z 208 may be controlled over a plurality of training cycles of the autoencoder 200 or 220.

There are numerous aspects of the autoencoder(s) 200 and 220 that may be adjusted for controlling the regularisation of style vector z that may include: selecting one or more probability distribution(s) $P(A_i)$ 214a-214n that correspond to one or more vector(s) $A_i$ 208a-208n where the style vector z comprises the one or more vector(s) $A_i$ 208a-208n and regularising style vector z 208 based on the selected probability distribution(s) 214a-214n. The vector(s) $A_i$ 208a-208n and probability distribution(s) 214a-214n are selected to ensure that regularising style vector z 208 further includes training the encoder network 202a of the autoencoder(s) 200 or 220 with input training data to enforce a selected probability distribution 214a-214n on at least a portion of the style vector z 208. The vector(s) $A_i$ 208a-208n and probability distribution(s) 214a-214n are selected to ensure that regularization of style vector z 208 increases the time invariance of the set of label vectors y 206 compared to a corresponding set of label vectors y 206 output from an autoencoder 200 or 220 without regularization.

Prior to training the autoencoder 200 or 220, a number of one or more vector(s) $A_i$ 208a-208n for partitioning the style vector z 208 may be selected and/or along with the size(s) of each of the one or more vector(s) $A_i$ 208a-208n. Selecting from a number of probability distributions or a plurality of probability distributions, one or more probability distribution(s) $P(A_i)$ 214a-214n corresponding to the selected vector(s) $A_i$ 208a-208n may also be selected. The style vector z 208 may be regularised based on the selected vector(s) $A_i$ 208a-208n and selected probability distribution(s) $P(A_i)$ 214a-214n, wherein the style vector z 208 is partitioned into the selected vector(s) $A_i$ 208a-208n or is the concatenation of the selected vector(s) $A_i$ 208a-208n.

As described previously with respect to FIGS. 2a-2e, one or more probability distribution(s) $P(A_i)$ 214a-214n and corresponding one or more vector(s) $A_i$ 208a-208n partitioning the style vector z 208 may be selected in which the regularisation of style vector z 208 improves or increases the time invariance of label vector(s) y 206 and/or ensures that the label vector(s) y 206 are substantially time invariant or even time invariant. These selections may be thought of as hyperparameters of the autoencoder 200 or 220 because they alter the configuration of or configure the autoencoder 200 or 220. Thus, the one or more selected probability distribution(s) $P(A_i)$ and corresponding one or more selected vector(s) $A_i$ partitioning the style vector z may be part of a set of hyperparameters.

As further modifications, the label vector y 206 may include, by way of example only but is not limited to, a vector, a tensor or otherwise, where the vector, tensor or otherwise includes at least one or more from the group of, by way of example only but is not limited to: a one hot vector; a measure of entropy; be regularized to L1 L2 or both, or other norms; a discrete boltzmann distributed vector; a representation of a prior class state; a known feature or configuration set. Alternatively or additionally, the style vector z 208 may include, by way of example only but is not limited to, a vector, a tensor or otherwise, wherein the vector, tensor or otherwise is penalised or regularised by at least one or more from the group of, by way of example only but is not limited to: a probability distribution; L1 L2 or both, or other norms; nuisance variables; and error variables. L1 and L2 are the well known "distance" measures or measure of total value of all the elements in a vector. To penalise or regularise using this measure is to minimise this measure.

Figure 3:
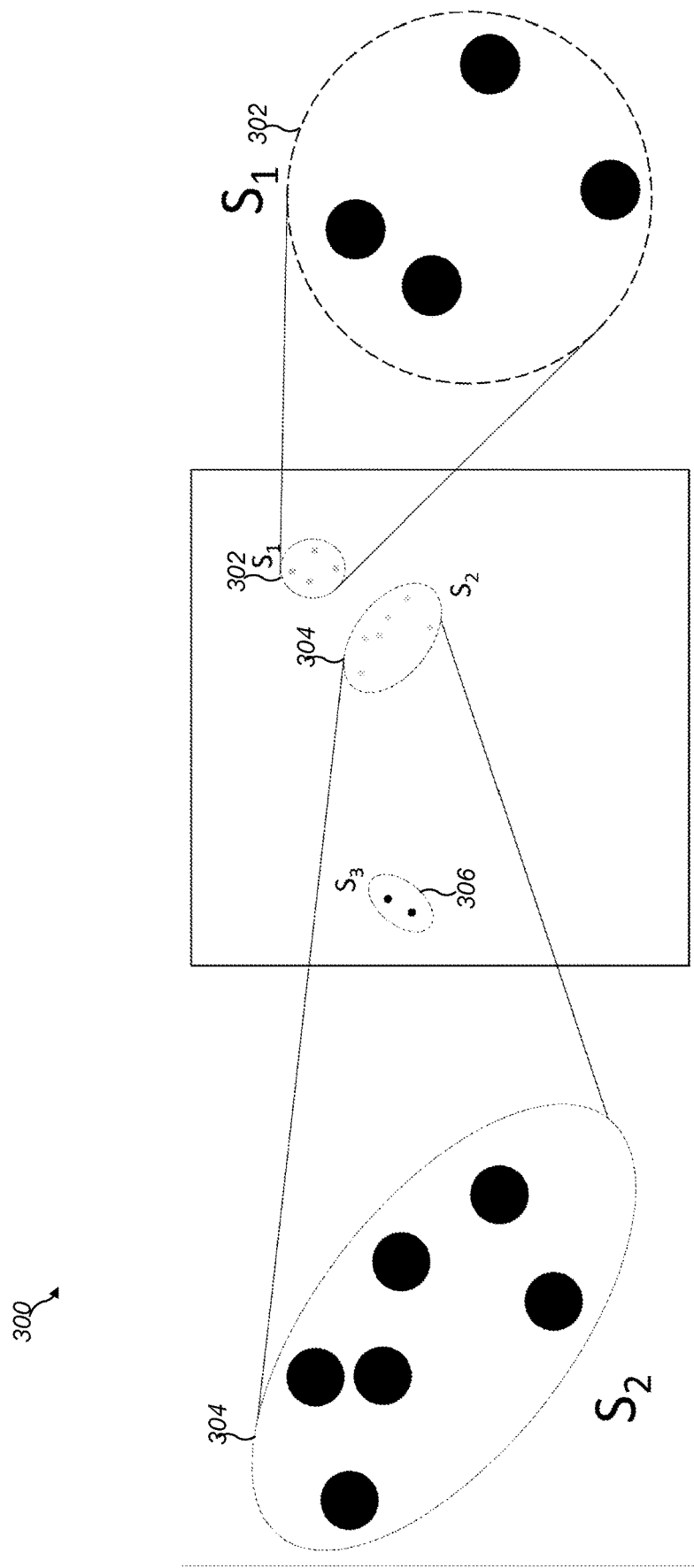
FIG. 3 is a schematic diagram illustrating an ideal clustering of vector labels.

FIG. 3 is a schematic diagram that illustrates an example clustering 300 of a set of label vector(s) y 206 in which the latent vector z was regularised for an ML technique using an ideal or optimal set of hyperparameters. This example illustrates an idealised scenario in which all the vector labels output by the ML technique that have clustered together in cluster region 302 belong to true state $S_1$, all the vector labels that have clustered together in cluster region 304 belong to true state $S_2$, and all the vector labels that have clustered together in cluster region 306 belong to true state $S_3$. In this case, given that ML technique outputs vector labels that cluster together and which belong to the same states, this may be an indication that temporal correlation has been minimised or even eliminated between adjacent input data samples (e.g. neural sample data sequences). Thus, the ML technique has been trained not to over represent the occurrence of a "temporal pattern" within the input data samples. Thus, this indicates that the ML technique and associated classifier are very robust and can cope with temporal changes in the high frequency time varying input data signal(s). Simply put, different states that are adjacent in time should map to different cluster regions. Similarly, different vector labels that are with in different cluster regions should map to different states. Thus, selection of a set of hyperparameters, especially one or more probability distribution(s) $P(A_i)$ 214a-214n and corresponding one or more vector(s) $A_i$ 208a-208n partitioning the style vector z 208, will affect the clustering and time invariance of the label vectors y 206 when regularisation on style vector z 208 is performed.

Figure 4A:
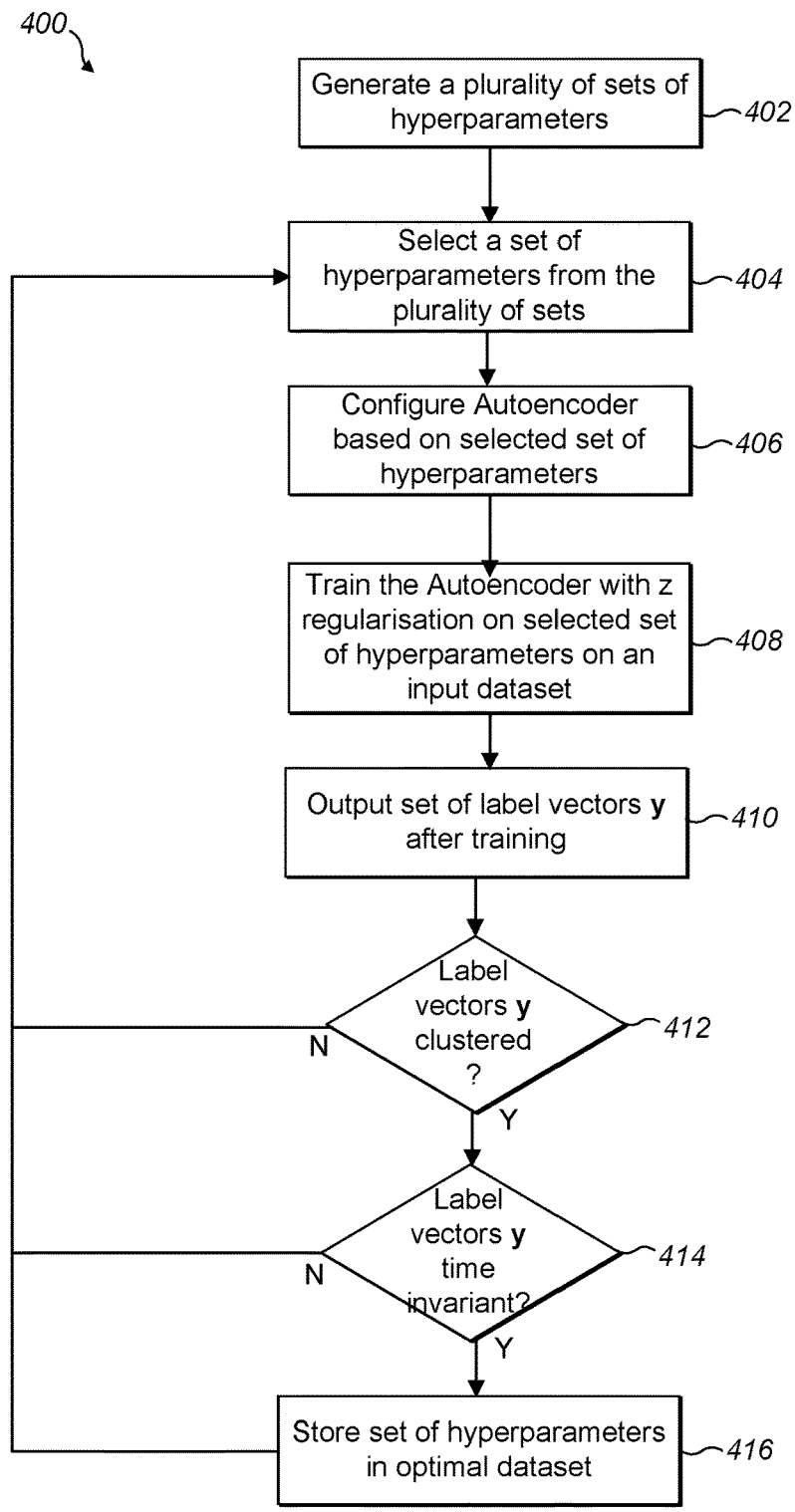
FIG. 4a is a flow diagram illustrating an example optimisation method for selecting hyperparameters for the ML technique(s) according to the invention.

FIG. 4a is a flow diagram illustrating an example optimisation method 400 for controlling the regularisation of style vector z and thus selecting suitable hyperparameters for use with the example ML technique(s) 200 or 220 of FIGS. 2a-2e according to the invention. As described previously with respect to FIGS. 2a-2e, one or more probability distribution(s) $P(A_i)$ 214a-214n and corresponding one or more vector(s) $A_i$ 208a-208n partitioning the style vector z 208 may be selected in which the regularisation of style vector z 208 improves or increases the time invariance of label vector(s) y 206 and/or ensures that the label vector(s) y 206 are substantially time invariant or even time invariant. These selections may be thought of as hyperparameters of the autoencoder 200 or 220 because they alter the configuration of or configure the autoencoder 200 or 220. Thus, the one or more selected probability distribution(s) $P(A_i)$ and corresponding one or more selected vector(s) $A_i$ partitioning the style vector z may be part of a set of hyperparameters. The following optimisation method includes, by way of example only but not limited to, the steps of:

Step 402, a plurality of sets of hyperparameters is generated, in which each set of hyperparameters includes the one or more selected probability distribution(s) $P(A_i)$ 214a-214n and data representing (e.g. number of vectors, size(s) or vectors etc.) the corresponding one or more selected vector(s) $A_i$ 208a-208n partitioning the style vector z, where said each set of hyperparameters defines an autoencoder structure. Each set of hyperparameters may be automatically and/or manually selected from ranges, step sizes, and other factors associated with the hyperparameters of the set that enable a search to be performed over the hyperparameter space to find those sets of hyperparameters that increase time invariance of label vector y 206 or ensure label vector y 206 is time invariant or substantially time invariant. Once generated, the method proceeds to step 404.

In step 404, for each set of hyperparameters of the plurality of sets of hyperparameters, a set of hyperparameters is selected from the plurality of sets of hyperparameters. The method 400 then proceeds to determine the clustering and time invariance performance of a set of label vector(s) y 206 of an autoencoder configured by the set of hyperparameters.

In step 406, the autoencoder 200 or 220 may be configured based on the selected set of hyperparameters. Once configured, in step 408, the style vector z is regularised based on the set of hyperparameters by training the configured autoencoder 200 or 220 on an input dataset (e.g. high frequency time varying input data samples or neurological signal(s) etc.). In step 410, a set of label vectors y is generated based on the trained autoencoder 200 or 220 and the input dataset.

In step 412, a multiple of clusters (or two or more clusters) may be determined based on the output set of label vectors y 206. This may involve detecting whether each of the clusters contains a subgroup of label vectors y 206 that are substantially the same or similar. Each cluster may be defined by a region or boundary and the subgroup of label vectors y 206 for each cluster are contained within the defined region or boundary, and label vectors y 206 are substantially the same or similar when they are contained within the region or boundary of the same cluster. If it is considered that the set of label vectors y 206 are clustered (e.g. 'Y'), then the method 400 proceeds to step 414, otherwise (e.g. 'N') it proceeds to step 404 to select another set of hyperparameters.

In step 414, in response to detecting that each cluster contains a subgroup of label vectors y 206 that are substantially the same or similar, the method proceeds to detect whether the set of label vectors y 206 are substantially time invariant. This may involve analysing the distribution of the vectors y 206 in the time domain to determine whether the vectors y 206 are, by way of example only but not limited to, time invariant, time dependent, or substantially time invariant. The set of label vectors y may be compared with previous sets of label vectors y generated on the same input dataset but with different sets of hyperparameters. The previous sets of label vectors y may have different degrees of time invariance and so could be used to score the output set of label vectors y. Alternatively, t-distributed Stochastic Neighbour Embedding (t-SNE) plots, to visualise the latent space of the autoencoder, combined with timing information may be analysed and determined whether the label vectors y have increased in time invariance compared with other iterations of the optimisation method 400. If it is considered that the set of label vectors y 206 have an increased time invariance or are substantially time invariant (e.g. 'Y'), then the method 400 proceeds to step 416, otherwise (e.g. 'N') the method proceeds to step 404 to select another set of hyperparameters.

In step 416, in response to detecting that each cluster contains a subgroup of label vectors y 206 that are substantially the same or similar and detecting that the set of label vectors y 206 are substantially time invariant, then the selected set of hyperparameters are considered to be a set of hyperparameters that may be stored in an optimised hyperparameter dataset. Each set of hyperparameters in the optimised hyperparameter dataset defines an autoencoder structure that can be trained to output substantially time invariant label vector(s) y 206, or label vector(s) y 206 with increased time invariance, by regularising style vector z 208 during training.

Thus, this method 400 may be performed on a plurality of sets of hyperparameters to determine which sets of hyperparameters result in an autoencoder structure that outputs as substantially time invariant or a time invariant label vector(s) y 206 by regularising style vector z 208 during training.

Although the set of hyperparameters included the one or more selected probability distribution(s) $P(A_i)$ 214a-214n and data representing (e.g. number of vectors, size(s) or vectors etc.) the corresponding one or more selected vector(s) $A_i$ 208a-208n partitioning the style vector z, the set of hyperparameters may further include one or more from the group of: autoencoder size, wherein the autoencoder size comprises a length of the encoder state; initial learning rate or decay; batch size, wherein batch size comprises the number of samples and defines the update of weights or parameters of the autoencoder neural network or hidden layer(s); size of the label vector y; number of classes or states associated with the label vector y; number of hidden layer(s), neural network cells, and/or long short term memory cells; feed size, wherein feed size comprises the number of time steps per data point or batch; loss weighting coefficient, wherein the loss weighting coefficient comprises a relative weighting to give to generative and discriminative losses when the autoencoder uses a discriminator and/or a generator neural network components; optimisation function for optimising the weights of the autoencoder neural network structure(s); type of weight update algorithm or procedure of the weights of the autoencoder neural network structure(s); learning rate decay factor, wherein learning rate decay factor is used to adjust learning rate when the loss associated with a loss cost function of the autoencoder plateaus or stagnates; and one or more performance checkpoint(s) for determining how often learning rate is to be adjusted.

The set of hyperparameters may further include one or more from the group of: autoencoder size, wherein the autoencoder size comprises a length of the encoder state in a range of 20 to 1500, or less or more depending on application; initial learning rate or decay in a range of 0.0001 to 0.1, or less or more depending on application; batch size, wherein batch size comprises the number of samples and defines the update of weights or parameters of the autoencoder neural network or hidden layer(s) and may be in a range of 64 to 1028, or less or more depending on application; size of the label vector y number of classes or states associated with the label vector y, which can be an arbitrary number depending on the application; number of hidden layer(s), neural network cells, and/or long short term memory cells—these may be in the range of 1 to 3 or more depending on application; feed size, wherein feed size comprises the number of time steps per data point or batch and may be in the range of 100 to 500, or less or more depending on application; loss weighting coefficient, wherein the loss weighting coefficient comprises a relative weighting to give to generative and discriminative losses when the autoencoder uses a discriminator and/or a generator neural network components and may be in the range of 0.1 to 1, or less or more depending on application; optimisation function for optimising the weights of the autoencoder neural network structure(s); type of weight update algorithm or procedure of the weights of the autoencoder neural network structure(s); learning rate decay factor, wherein learning rate decay factor is used to adjust learning rate when the loss associated with a loss cost function of the autoencoder plateaus or stagnates; and one or more performance checkpoint(s) for determining how often learning rate is to be adjusted.

Furthermore, the optimising method 400 may further include: clustering the set of label vectors y to form multiple clusters of label vectors y in which each cluster contains a subgroup of label vectors y that are substantially the same or similar, and mapping each of the clusters of label vectors y to a class or state label from a set of class or state labels S associated with the input data for use by an autoencoder defined by the set of hyperparameters in classifying input data.

Further data representing the structure of an autoencoder such as, by way of example only but not limited to, a set of autoencoder configuration data may be stored for later retrieval for configuring an autoencoder. For example, a set of autoencoder configuration data may be stored in an optimised autoencoder configuration dataset, the set of autoencoder configuration data comprising data representative of one or more from the group of: data representative of the set of hyperparameters stored in the optimised hyperparameter dataset; data representative of the clusters of label vectors y; data representative of the mapping of each of the clusters of label vectors y to class or state labels S; and data representative of the weights and/or parameters of one or more neural network(s) and/or hidden layer(s) associated with the trained autoencoder.

Thus, a set of autoencoder configuration data may be selected from the optimised autoencoder configuration dataset and applied to an autoencoder. The autoencoder may be configured based on the set of autoencoder configuration data, where the autoencoder outputs a latent vector of an N-dimensional latent space for classifying input data, the latent vector comprising a label vector y 206 and a style vector z 208 where the autoencoder is configured based on data representative of the weights and/or parameters of one or more neural network(s) and/or hidden layer(s) associated with the trained autoencoder of the set of autoencoder configuration data, wherein the trained autoencoder regularised the style vector z 208 and outputs substantially time invariant label vector(s) y 206.

Alternatively or additionally, an autoencoder system or a user may retrieve a selected one or more probability distributions and a selected one or more vector(s) $A_i$ in which the regularization of style vector z based on the retrieved probability distribution(s) and corresponding vector(s) $A_i$ increases the time invariance of the label vector y compared with when style vector z is not regularized during training. The retrieved distributions and vectors may be used to configure a regularisation component/network 212 or 212a-212n of the autoencoder based on the retrieved probability distribution(s) and corresponding vector(s) $A_i$. The autoencoder may be trained in which regularizing latent vector z is based on an input dataset for generating a set of label vectors y, wherein the set of label vectors y map to a set of states or class labels associated with the input data. Classifying further data by inputting the further data to the trained autoencoder and mapping output label vectors y to the set of states or class labels, wherein the output label vectors y are substantially time invariant based on the retrieved probability distribution(s) and corresponding vector(s) $A_i$.

As described herein, the input data may include any input data based on one or more time varying input signal(s) or one or more high frequency time varying input signal(s). For example, the input data may include, by way of example only but not limited to, neural sample data associated with one or more neurological signal(s). Thus, the autoencoder may be trained based on a training dataset of neural sample data. The autoencoder may be trained based on a training dataset of neural sample data, the neural sample data partitioned into mutually exclusive subsets of neural sample data, wherein each subset of neural sample data corresponds to a state or class label identifying the neural sample data contained therein. The label vector y corresponds to a neural data label vector that is capable of classifying each portion of neural sample data from a training set of neural sample data into one or more neural data labels.

Thus, the method 400 may be used to discover optimal sets of hyperparameters including appropriate one or more probability distributions and corresponding one or more vector(s) $A_i$ that ensure an increase in time invariance in label vector y due to regularising the one or more vector(s) $A_i$ of style vector z based on the corresponding probability distributions.

Figure 4B:
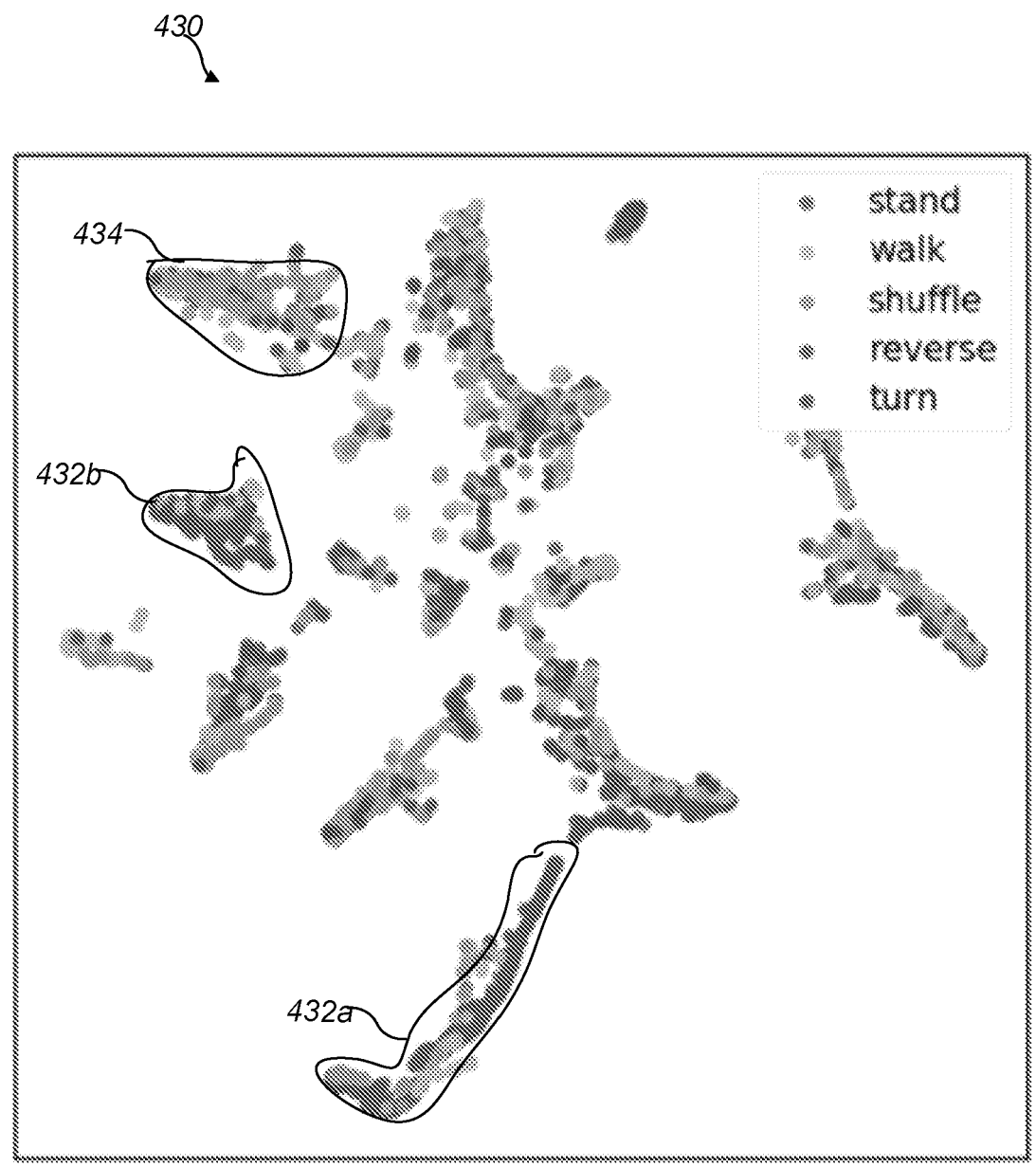
FIG. 4b is a graph illustrating an example t-SNE plot of vector labels for a ML technique according to the invention.
Figure 4C:
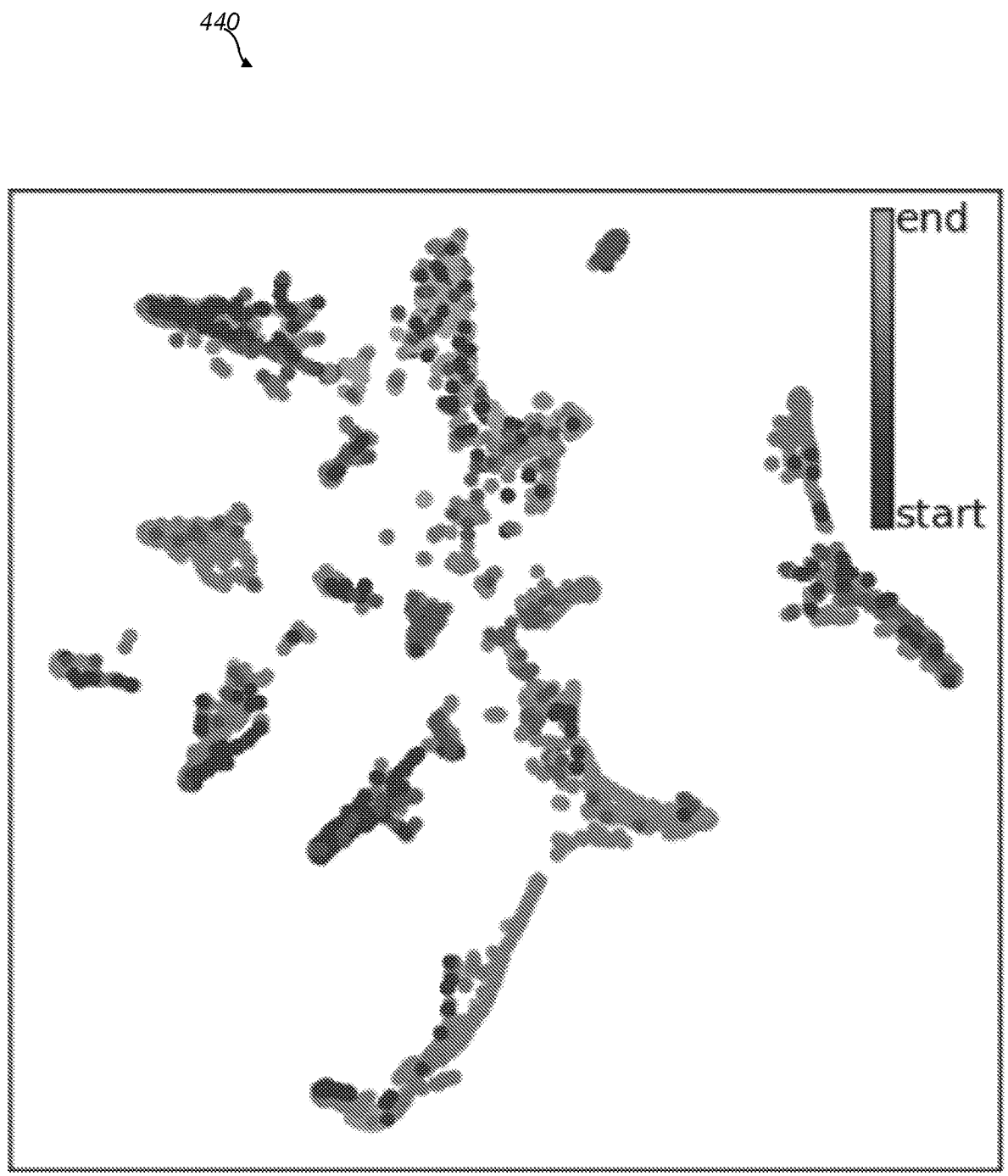
FIG. 4c is a graph illustrating an example t-SNE plot of the time variance of the vector labels of FIG. 4b.

FIGS. 4b and 4c are graphical t-Distributed Stochastic Neighbour Embedding (t-SNE) diagrams illustrating an example t-SNE clustering graph 430 in FIG. 4b coloured by true state/class and an example t-SNE time domain graph 440 in FIG. 4c coloured by time of recording in relation to the trial described with reference to FIG. 2a and autoencoder 200. t-SNE is one of several techniques, e.g. isomap or Principal component analysis, for dimensionality reduction that is particularly well suited for the visualization of high-dimensional datasets, such as a set of label vectors y 206, in the form of a scatter plot.

In the trial, the set of hyperparameters that were selected included the number of one or more vectors $A_i$ being one vector $A_1$ (e.g. style vector $z=[A_1]$) and the selected probability distribution being the standard Gaussian or Normal distribution with mean equal to zero and unit variance (e.g. $P(A_1)=N(A_1|0,I)$). In the trial, the high frequency time varying input data was a 15 multichannel neurological sample signal(s) from a subject in which 5 true states were defined for classifying the neural activity contained within the input multichannel neurological sample signal(s). The 5 true states were "stand", "walk", "shuffle", "reverse" and "turn". The autoencoder 200 of FIG. 2a was trained on the input neurological sample signal(s) in which the style vector z 208 was regularised based on the normal distribution. A set of label vectors y 206 were determined and classified based on the 5 true states.

FIG. 4b is the t-SNE clustering graph 430 of the set of label vectors y output from the autoencoder 200 after training. As can be seen several clusters 432a, 432b and 434 formed. The clusters 432a and 432b were identified to be associated mainly with the true state "stand" and the cluster 434 was identified to be associated mainly with the true state "shuffle". The autoencoder 200 after training managed to form several well formed clusters of label vectors y. Given that the input neurological sample signal(s) were a high frequency time varying input data samples of a neural-raw dataset, there was some inter-class overlap in the t-SNR plots. Here each data point (e.g. label vector y) spans a time of only 0.00167s and thus there could be several data points that are not related to the action/class that it was labelled as. Moreover, it would be extremely impractical and imprecise to assign a true state accurately to each point. It should also be noted that the clusters in the t-SNE plots are not necessarily the eventual clusters of labels derived from the maximum values in each label vector y representation.

FIG. 4c is the t-SNE time domain graph 440, which was used to ensure that the data points (e.g. label vectors y) are not simply clustered with respect to time of recording. the t-SNE time domain graph 440 is the t-SNE clustering graph 430 overlaid with a colour bar of the recording time. From this colour bar, it is evident that clusters contain data points from different and various points in time. This shows that the clusters of label vectors y are time invariant and that the autoencoder 200 after training with regularisation of style vector z has reduced or minimised the amount of temporal correlation of adjacent the input neurological sample signal(s).

Figure 4D:
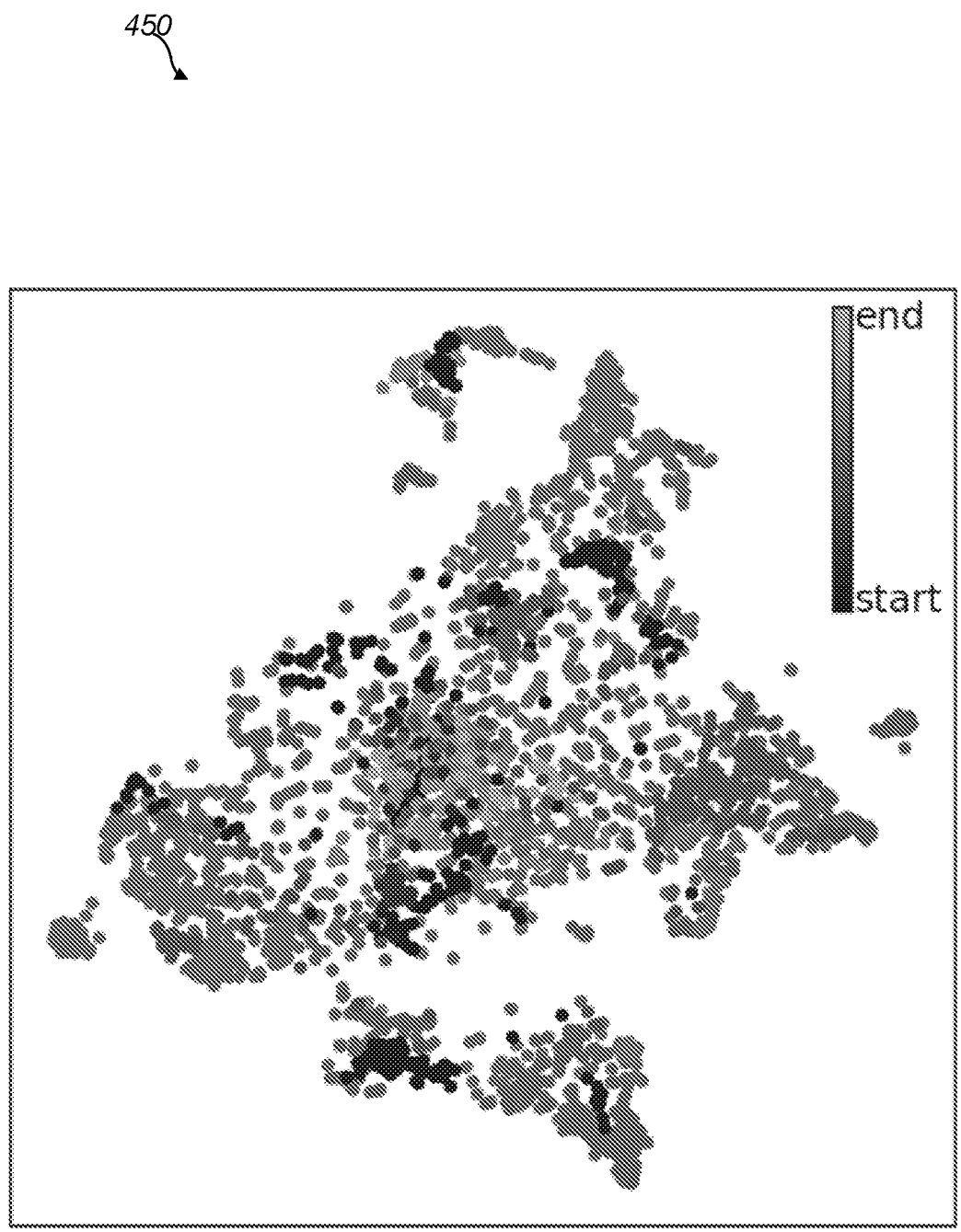
FIG. 4d is a graph illustrating an example t-SNE plot of the vector labels and time variance of the vector labels for an autoencoder trained without regularisation of style vector z.

FIG. 4d is a t-SNE clustering graph with time domain graph 450 overlaid of a set of label vectors y output from the autoencoder 200 after training without regularisation of the style vector z. It is clear from this plot that there is no state/class separability shown by the homogeneous point cloud within the t-SNE space. Furthermore, the corners of the plot show the same level of grey intensity indicating the autoencoder is over representing the occurrence of a "temporal pattern" within the input neurological sample signal(s). FIG. 4d illustrated that the label vectors y are time dependent and that the autoencoder 200 after training without regularisation of style vector z has increased the amount of temporal correlation of adjacent the input neurological sample signal(s) compared with when the autoencoder 200 was trained with regularisation of style vector z as in FIGS. 4b and 4c.

Figure 5A:
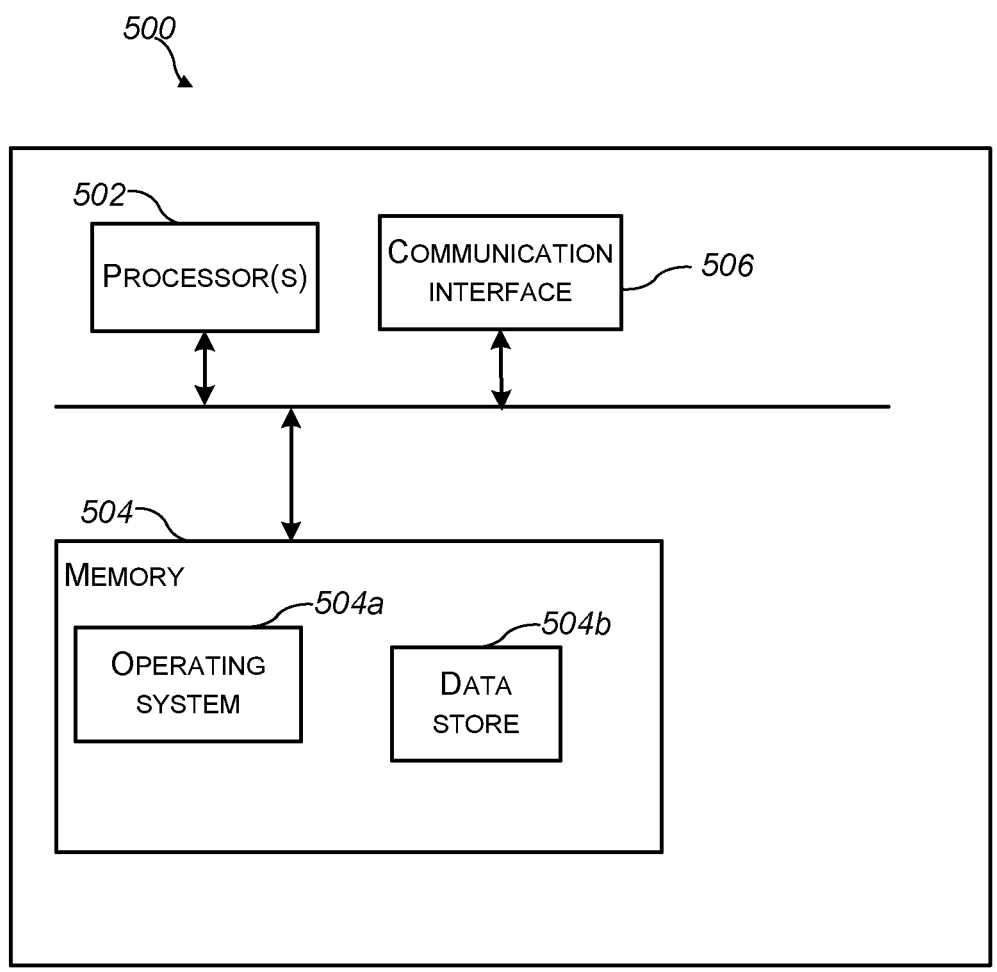
FIG. 5a is a schematic diagram illustrating a example computing device for use with ML technique(s) according to the invention.

FIG. 5a is a schematic diagram illustrating a example computing device 500 that may be used to implement one or more aspects of the ML technique(s) with regularisation of style vector z according to the invention and/or includes the methods and/or autoencoder(s)/system(s) and apparatus as described with reference to FIGS. 1a-4c. Computing device 500 includes one or more processor unit(s) 502, memory unit 504 and communication interface 506 in which the one or more processor unit(s) 502 are connected to the memory unit 504 and the communication interface 506. The communications interface 506 may connect the computing device 500 with a subject, one or more device(s), one or more sensor(s), external or cloud storage or processing system(s). The memory unit 504 may store one or more program instructions, code or components such as, by way of example only but not limited to, an operating system 504a for operating computing device 502 and a data store 504b for storing additional data and/or further program instructions, code and/or components associated with implementing the functionality and/or one or more function(s) or functionality associated with one or more autoencoder(s), optimisation method(s), labelling and/or training dataset(s) generation, one or more of the method(s) and/or process(es) of autoencoder(s) and/or optimisation system(s)/platforms as described with reference to at least one of FIGS. 1a to 4c.

The computing device 500 may be configured to implement an autoencoder, in which the autoencoder outputting a latent vector of an N-dimensional latent space for classifying input data, the latent vector comprising a label vector y and a style vector z, where the communication interface 506 may be configured to retrieve data representative of a trained autoencoder structure (e.g. from one or more external systems or cloud storage or processing systems) in which the style vector z is regularised during training ensuring one or more label vector(s) y are substantially time invariant. The computer device 500 may configure the autoencoder based on the retrieved autoencoder structure; and classify one or more label vector(s) y associated with the input data, wherein the one or more label vector(s) y are substantially time invariant.

The data representative of an autoencoder structure is based on an autoencoder that was trained in accordance the method(s) and/or process(es) as described with reference to FIGS. 1a to 4c.

Figure 5B:
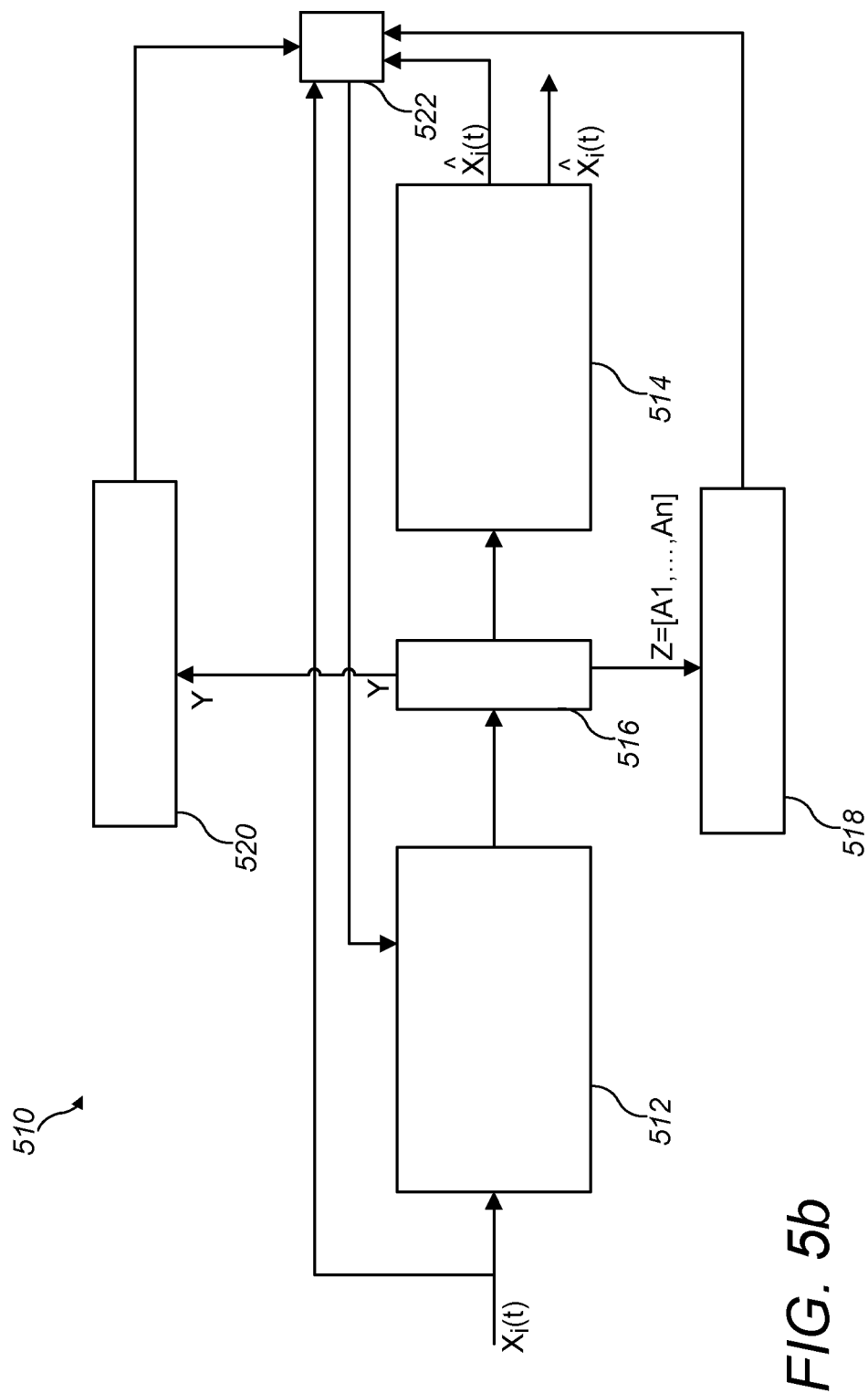
FIG. 5b is a schematic diagram illustrating a example apparatus or device for use with ML technique(s) according to the invention.

FIG. 5b a schematic diagram illustrating a example apparatus or device 510 that may be used to implement one or more aspects of the ML technique(s) with regularisation of style vector z according to the invention and/or includes the methods and/or autoencoder(s)/system(s) and apparatus as described with reference to FIGS. 1a-4c. The apparatus 510 may include one or more processor unit(s), one or more memory unit(s), and/or communication interface in which the one or more processor unit(s) are connected to the memory unit and/or the communication interface. The apparatus or device 500 may include an encoding network 512, a decoding network 514, a latent representation layer 516 for outputting a style vector z and an output label vector y of the latent space. The style vector z may include one or more selected vector(s) $A_i$ corresponding with one or more selected probability distribution(s). The output of the encoding network 512 is connected to the latent representation layer 516, and the latent representation layer 516 is connected to the input of the decoding network 514. The apparatus or device 500 further includes a regularisation component/network 518 connected to the latent representation layer 516, in which the regularisation component/network 518 is configured for regularising the style vector z during training of the apparatus or device 510 on an input data samples, which ensures or effects a substantially time invariant output label vector y when the apparatus 510 classifies input data samples during and after training, or in real-time operation.

The regularisation component/network 518 of the apparatus 500 may further include one or more regularising network(s), each regularising network comprising an input layer and a discriminator network comprising one or more hidden layer(s) and an output layer for outputting a generator loss function, $L_{GAi}$, where the input layer is connected to a corresponding one of the one or more of the selected vector(s) $A_i$ of style vector z. Each of the regularising network(s) is configured, during training, for training their discriminator network to distinguish between the corresponding vector $A_i$ of latent vector, z, and a sample vector generated from the corresponding selected probability distribution $P(A_i)$. The sample vector is of the same dimension as vector $A_i$ of the latent vector, z. Each regularising network outputs the generator loss function value, $L_{GAi}$, for training the encoder network to enforce the probability distribution $P(A_i)$ on the corresponding vector $A_i$ of the style vector z.

The apparatus 510 may further include an adversarial network 520 coupled to the label vector y. The adversarial network 520 may include an input layer, one or more hidden layer(s), and an output layer for outputting an generator loss function, $L_{GY}$, associated with label vector y. The input layer of the adversarial network 520 is connected to the label vector, y, where the adversarial network 520 is configured, during training, for training the one or more hidden layer(s) to distinguish between label vectors y and sample vectors from a categorical distribution of a set of one hot vectors of the same dimension as the label vector y. The adversarial network outputs the generator loss function value $L_{GY}$ associated with label vector y for training the encoder network to enforce the categorical distribution on the label vector y.

The apparatus 500 may be trained on input data samples using a loss or cost function, represented by 522, based on, by way of example only but is not limited to, the generator loss, a combination of label vector generator loss function value, and the style vector generator loss function value, a reconstruction loss based on the output from the decoding network 516 and the original input data samples input to the encoder network 512. The weights of the hidden layer(s) of the encoding network 512 and/or decoding network 516 may be updated based on the generated loss of cost function of cost module 522.

Although FIG. 5b describes apparatus 500 having an adversarial network 520, this is by way of example only and the apparatus 500 is not so limited, it is to be appreciated by the skilled person that the apparatus 500 does not necessarily require an adversarial network 520 whilst regularising z in order to make the label vector y more time invariant. Thus, apparatus 500 may not require label vector y to be constrained, forced to conform to a categorical distribution, or restricted by an adversarial network 520. Instead, the adversarial network 520 may be replaced by or combined with one or more or any other classification technique(s) that may be applicable to be used in place of or combined with the adversarial network 520. Thus, adversarial network 520 could be replaced by one or more other classification technique(s) and/or modified based on one or more other classification technique(s) whilst apparatus 500 may still regularise style vector z such that label vector y is substantially time invariant or time invariant compared with when style vector z is not regularised.

Further modifications may be made to the autoencoder 200 or 220 by removing the adversarial network 210 and replacing with any suitable classification technique for operating on the label vector y. It is to be appreciated that the advantages of regularizing style vector z do not require label vector y to be a one-hot like vector. For example, a modified autoencoder 200 or 220 may be configured by removing the adversarial network 210 such that the label vector y is not constrained or restricted by an adversarial network, and where the autoencoder may further include the latent representation layer outputting the label vector y of the latent space, in which an classification component or technique coupled to the label vector y operates on and/or classifies the label vector y. In cases where the label vector y is not being restricted to a one-hot label like vector, the label vector y may be, by way of example only but is not limited to, a soft vector, any other representation that is not a one-hot like vector, any other representation that is a one-hot like vector but not generated based on an adversarial network 210, or in which the label vector y is a dense soft vector, or any other data representation of label vector y suitable for an appropriate classification technique.

Although FIGS. 2a to 2e describe the style vector z is regularised or that the one or more selected vector(s) Ai are regularised, this is by way of example only and the autoencoder 200 or 220 is not limited, but it is to be appreciated by the skilled person that regularising the style vector z may further include, by way of example only but not limited to, regularising a portion of the style vector z, regularising a section of the style vector z, regularising a subvector of the style vector z, in which the subvector of the style vector z is a subgroup of the selected vectors Ai and/or the length of the subvector of the style vector z is less than the length of the style vector z. The subvector of style vector z may be a concatenation of two or more selected vectors Ai, in which the length of subvector is less than the style vector z. Alternatively or additionally, regularising the style vector z may further include selecting a subgroup of the selected vector(s) $A_i$ and corresponding selected probability distributions $P(A_i)$, and regularising only the subgroup of the selected vector(s) $A_i$ of the style vector z, where the number of vector(s) $A_i$ in the subgroup of vector(s) $A_i$ is less than the selected number of vector(s) $A_i$.

Further aspect of the invention may include one or more apparatus and/or devices that include a communications interface, a memory unit, and a processor unit, the processor unit connected to the communications interface and the memory unit, wherein the processor unit, storage unit, communications interface are configured to perform the autoencoder(s), method(s) and/or process(es) or combinations thereof as described herein with reference to FIGS. 1a to 5b.

In the embodiment described above the server may comprise a single server or network of servers. In some examples the functionality of the server may be provided by a network of servers distributed across a geographical area, such as a worldwide distributed network of servers, and a user may be connected to an appropriate one of the network of servers based upon a user location.

The above description discusses embodiments of the invention with reference to a single user for clarity. It will be understood that in practice the system may be shared by a plurality of users, and possibly by a very large number of users simultaneously.

The embodiments described above are fully automatic. In some examples a user or operator of the system may manually instruct some steps of the method to be carried out.

In the described embodiments of the invention the system may be implemented as any form of a computing and/or electronic device. Such a device may comprise one or more processors which may be microprocessors, controllers or any other suitable type of processors for processing computer executable instructions to control the operation of the device in order to gather and record routing information. In some examples, for example where a system on a chip architecture is used, the processors may include one or more fixed function blocks (also referred to as accelerators) which implement a part of the method in hardware (rather than software or firmware). Platform software comprising an operating system or any other suitable platform software may be provided at the computing-based device to enable application software to be executed on the device.

Various functions described herein can be implemented in hardware, software, or any combination thereof. If implemented in software, the functions can be stored on or transmitted over as one or more instructions or code on a computer-readable medium. Computer-readable media may include, for example, computer-readable storage media. Computer-readable storage media may include volatile or non-volatile, removable or non-removable media implemented in any method or technology for storage of information such as computer readable instructions, data structures, program modules or other data. A computer-readable storage media can be any available storage media that may be accessed by a computer. By way of example, and not limitation, such computer-readable storage media may comprise RAM, ROM, EEPROM, flash memory or other memory devices, CD-ROM or other optical disc storage, magnetic disc storage or other magnetic storage devices, or any other medium that can be used to carry or store desired program code in the form of instructions or data structures and that can be accessed by a computer. Disc and disk, as used herein, include compact disc (CD), laser disc, optical disc, digital versatile disc (DVD), floppy disk, and blu-ray disc (BD). Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, DSL, or wireless technologies such as infrared, radio, and microwave are included in the definition of communication medium. Combinations of the above should also be included within the scope of computer-readable media.

Alternatively, or in addition, the functionality described herein can be performed, at least in part, by one or more hardware logic components. For example, and without limitation, hardware logic components that can be used may include Field-programmable Gate Arrays (FPGAs), Program-specific Integrated Circuits (ASICs), Program-specific Standard Products (ASSPs), System-on-a-chip systems (SOCs). Complex Programmable Logic Devices (CPLDs), etc.

Although illustrated as a single system, it is to be understood that the computing device, apparatus or any of the functionality that is described herein may be performed on a distributed computing system, such as, by way of example only but not limited to one or more server(s), one or more cloud computing system(s). Thus, for instance, several devices may be in communication by way of a network connection and may collectively perform tasks described as being performed by the computing device.

Although illustrated as a local device it will be appreciated that the computing device may be located remotely and accessed via a network or other communication link (for example using a communication interface).

The term 'computer' is used herein to refer to any device with processing capability such that it can execute instructions. Those skilled in the art will realise that such processing capabilities are incorporated into many different devices and therefore the term 'computer' includes PCs, servers, mobile telephones, personal digital assistants and many other devices.

Those skilled in the art will realise that storage devices utilised to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realise that by utilising conventional techniques known to those skilled in the art that all, or a portion of the software instructions may be carried out by a dedicated circuit, such as a DSP, programmable logic array, or the like.

It will be understood that the benefits and advantages described above may relate to one embodiment or may relate to several embodiments. The embodiments are not limited to those that solve any or all of the stated problems or those that have any or all of the stated benefits and advantages.

Any reference to 'an' item refers to one or more of those items. The term 'comprising' is used herein to mean including the method steps or elements identified, but that such steps or elements do not comprise an exclusive list and a method or apparatus may contain additional steps or elements.

As used herein, the terms "component" and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices.

Further, as used herein, the term "exemplary" is intended to mean "serving as an illustration or example of something".

Further, to the extent that the term "includes" is used in either the detailed description or the claims, such term is intended to be inclusive in a manner similar to the term "comprising" as "comprising" is interpreted when employed as a transitional word in a claim.

The figures illustrate exemplary methods. While the methods are shown and described as being a series of acts that are performed in a particular sequence, it is to be understood and appreciated that the methods are not limited by the order of the sequence. For example, some acts can occur in a different order than what is described herein. In addition, an act can occur concurrently with another act. Further, in some instances, not all acts may be required to implement a method described herein.

Moreover, the acts described herein may comprise computer-executable instructions that can be implemented by one or more processors and/or stored on a computer-readable medium or media. The computer-executable instructions can include routines, sub-routines, programs, threads of execution, and/or the like. Still further, results of acts of the methods can be stored in a computer-readable medium, displayed on a display device, and/or the like.

The order of the steps of the methods described herein is exemplary, but the steps may be carried out in any suitable order, or simultaneously where appropriate. Additionally, steps may be added or substituted in, or individual steps may be deleted from any of the methods without departing from the scope of the subject matter described herein. Aspects of any of the examples described above may be combined with aspects of any of the other examples described to form further examples without losing the effect sought.

It will be understood that the above description of a preferred embodiment is given by way of example only and that various modifications may be made by those skilled in the art. What has been described above includes examples of one or more embodiments. It is, of course, not possible to describe every conceivable modification and alteration of the above devices or methods for purposes of describing the aforementioned aspects, but one of ordinary skill in the art can recognize that many further modifications and permutations of various aspects are possible. Accordingly, the described aspects are intended to embrace all such alterations, modifications, and variations that fall within the scope of the appended claims.

The invention claimed is:

1. A computer implemented method for training an autoencoder, the autoencoder outputting a latent vector of an N-dimensional latent space for classifying input data, the latent vector comprising a label vector y and a style vector z, the method comprising regularising the style vector z during training for effecting time invariance in the set of label vectors y associated with the input data.

2. The computer implemented method of claim 1, wherein regularising the style vector z is based on a selected one or more probability distribution(s)$P(A_i)$ and corresponding one or more vector(s) $A_i$, wherein the style vector z comprises the one or more vector(s)$A_i$.

3. The computer implemented method of claim 1, wherein regularising the style vector z further comprises training an encoder network of the autoencoder with input training data to enforce a selected probability distribution on at least a portion of the style vector z.

4. The computer implemented method of claim 1, wherein regularising the style vector z increases the time invariance of the set of label vectors y during training.

5. The computer implemented method of claim 1, wherein regularising the style vector z further comprising, prior to training the autoencoder:
   selecting a number of one or more vector(s) $A_i$, for partitioning the style vector z; selecting a number of one or more probability distribution(s)$P(A_i)$ corresponding to the selected vector(s) $A_i$, and
   regularising the style vector z further comprises regularising each of the selected vector(s) $A_i$ based on the corresponding selected probability distribution $P(A_i)$, wherein the style vector z is partitioned into the selected vector(s)$A_i$.

6. The computer implemented method of claim 1, wherein regularising z further comprises retrieving a set of hyperparameters comprising one or more selected probability distribution(s)$P(A_i)$ and corresponding one or more selected vector(s) $A_i$ partitioning the style vector z, wherein said set of hyperparameters defines an autoencoder structure that can be trained to output substantially time invariant label vector(s) y by regularising style vector z during training based on the one or more selected probability distribution(s)$P(A_i)$ and corresponding one or more selected vector(s)$A_i$.

7. The computer implemented method of claim 1, wherein regularising the style vector z during training causes the label vectors y associated with input data to form multiple or two or more clusters of label vectors y, wherein each contains a subgroup of label vectors y that are substantially the same or similar, and the set of label vectors y are substantially time invariant.

8. The computer implemented method as claimed in claim 7, wherein each cluster is defined by a region or boundary and the subgroup of label vectors y for each cluster are contained within the defined region or boundary, and label vectors y are substantially the same or similar when they are contained within the region or boundary of the same cluster, wherein the cluster relates to a true state or class label.

9. The computer implemented method of claim 7, further comprising:
   clustering the set of label vectors y to form multiple clusters of label vectors y in which each cluster contains a subgroup of label vectors y that are substantially the same or similar; and
   mapping each of the clusters of label vectors y to a class or state label from a set of class or state labels S associated with the input data for use by the trained autoencoder in classifying input data.

10. The computer implemented method of claim 1, wherein the input data comprises input data based on one or more high frequency time varying input signal(s).

11. The computer implemented method of claim 1, wherein the input data comprises neural sample data associated with one or more neurological signal(s).

12. The computer implemented method of claim 2, wherein the autoencoder further comprises:
   a latent representation layer for outputting a style vector, z, of the latent space, wherein the style vector z comprises the one or more selected vector(s) $A_i$; and
   one or more regularising network(s), each regularising network comprising an input layer and a discriminator network comprising one or more hidden layer(s) and an output layer for evaluating a generator loss function, $L_{GAi}$, wherein the input layer is connected to a corresponding one of the one or more selected vector(s) $A_i$ of style vector z; the method further comprising:

regularising the latent vector z, further comprising, for each of the regularising network(s):
training said each regularising network to distinguish between the corresponding vector $A_i$, of latent vector, z, and a sample vector generated from the corresponding selected probability distribution $P(A_i)$, wherein the sample vector is of the same dimension as vector A, of the latent vector, z;
outputting the generator loss function value, $L_{GAi}$, for use by the autoencoder in training an encoder network to enforce the probability distribution $P(A_i)$ on the vector $A_i$ of the latent vector z.

13. The computer implemented method of claim 2, wherein the autoencoder further comprises:
the latent representation layer outputting the label vector, y, of the latent space; and an adversarial network coupled comprising an input layer, one or more hidden layer(s), and an output layer for evaluating a generator loss function, $L_{GY}$, associated with label vector y, wherein the input layer of the adversarial network is connected to the label vector, y; the method further comprising:
training the adversarial network to distinguish between label vectors, y, generated by the latent representation layer and sample vectors from a categorical distribution of a set of one hot vectors of the same dimension as the label vector, y; and
outputting the generator loss function value, $L_{GY}$, associated with label vector y for use by the autoencoder in training an encoder network to enforce the categorical distribution on the label vector y.

14. An apparatus comprising:
an encoding network;
a decoding network;
a latent representation layer for outputting a style vector, z, and an output label vector y of the latent space, wherein the style vector z comprises one or more selected vector(s) $A_i$, corresponding with one or more selected probability distribution(s) and the output of the encoding network is connected to the latent representation layer, and the latent
representation layer is connected to the input of the decoding network; and
a regularisation component connected to the latent representation layer, the regularisation component configured for regularising the style vector z during training of the apparatus and effecting a substantially time invariant output label vector y when the apparatus classifies input data.

15. The apparatus as claimed in claim 14, the regularisation component further comprising:
one or more regularising network(s), each regularising network comprising an input layer and a discriminator network comprising one or more hidden layer(s) and an output layer for evaluating a generator loss function, $L_{GAi}$, wherein the input layer is connected to a corresponding one of the one or more selected vector(s) $A_i$ of style vector z; wherein:
each of the regularising network(s) is configured, during training, for:
training the discriminator network to distinguish between the corresponding vector $A_i$, of latent vector, z, and a sample vector generated from the corresponding selected probability distribution $P(A_i)$, wherein the sample vector is of the same dimension as vector A, of the latent vector, z; and
outputting the generator loss function value, $L_{GAi}$, for training the encoder network to enforce the probability distribution $P(A_i)$ on the vector $A_i$ of the latent vector z.

16. The apparatus as claimed in claim 15, wherein the autoencoder further comprises: an adversarial network coupled comprising an input layer, one or more hidden layer(s), and an output layer for evaluating an generator loss function, $L_{GY}$, associated with label vector y, wherein the input layer of the adversarial network is connected to the label vector, y; wherein the adversarial network is configured, during training, for:
training the one or more hidden layer(s) to distinguish between label vectors, y, and sample vectors from a categorical distribution of a set of one hot vectors of the same dimension as the label vector, y; and
outputting the generator loss function value, $L_{GY}$, associated with label vector y for training the encoder network to enforce the categorical distribution on the label vector y.

17. A computer implemented method for an autoencoder, the autoencoder outputting a latent vector of an N-dimensional latent space for classifying input data, the latent vector comprising a label vector y and a style vector z, the method comprising controlling the regularization of style vector z to increase or decrease the time invariance of the label vectors y by selecting one or more probability distribution(s) $P(A_i)$ and corresponding one or more vector(s) $A_i$ wherein the style vector z comprises the one or more vector(s) $A_i$ and regularising style vector z based on the selected probability distribution(s), the method of controlling further comprising:
generating a plurality of sets of hyperparameters, each set of hyperparameters comprising one or more selected probability distribution(s) $P(A_i)$ and corresponding one or more selected vector(s) $A_i$ partitioning the style vector z, wherein said each set of hyperparameters defines an autoencoder structure;
for each set of hyperparameters of the plurality of sets of hyperparameters, determining the clustering and time invariance performance of the label vector y of the autoencoder by:
configuring the autoencoder based on the set of hyperparameters;
regularizing the style vector z based on the set of hyperparameters by training the configured autoencoder on input data;
generating a set of label vectors y based on the trained autoencoder and input data;
determining multiple or two or more clusters of the label vectors y;
detect whether each cluster contains a subgroup of label vectors y that are substantially the same or similar;
in response to detecting that each cluster contains a subgroup of label vectors y that are substantially the same or similar, storing the selected set of hyperparameters in an optimised hyperparameter dataset, wherein said each set of hyperparameters in the optimised hyperparameter dataset defines an autoencoder structure that can be trained to output substantially time invariant label vector(s) y by regularising style vector z during training.

18. The computer implemented method of claim 17, wherein each cluster is defined by a region or boundary and the subgroup of label vectors y for each cluster are contained within the defined region or boundary, and label vectors y are substantially the same or similar when they are contained within the region or boundary of the same cluster.

19. The computer implemented method of claim 17, further comprising:
   clustering the set of label vectors y to form multiple clusters of label vectors y in which each cluster contains a subgroup of label vectors y that are substantially the same or similar; and
   mapping each of the clusters of label vectors y to a class or state label from a set of class or state labels S associated with the input data for use by an autoencoder defined by the set of hyperparameters in classifying input data.

20. The computer implemented method of claim 17, further comprising:
   storing a set of autoencoder configuration data in an optimised autoencoder configuration dataset, the set of autoencoder configuration data comprising data
   representative of one or more from the group of:
   data representative of the set of hyperparameters stored in the optimised hyperparameter dataset;
   data representative of the clusters of label vectors y;
   data representative of the mapping of each of the clusters of label vectors y to class or state labels S; and
   data representative of the weights and/or parameters of one or more neural network(s) and/or hidden layer(s) associated with the trained autoencoder.

\* \* \* \* \*